(12) United States Patent
Kojima

(10) Patent No.: US 12,204,326 B2
(45) Date of Patent: Jan. 21, 2025

(54) WIRING UNIT, SERIAL CASCADE CONNECTOR SYSTEM

(71) Applicant: Keyence Corporation, Osaka (JP)

(72) Inventor: Kenji Kojima, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 18/229,187

(22) Filed: Aug. 2, 2023

(65) Prior Publication Data
US 2024/0053711 A1    Feb. 15, 2024

(30) Foreign Application Priority Data
Aug. 10, 2022    (JP) ................................ 2022-127765

(51) Int. Cl.
*G05B 9/02*    (2006.01)

(52) U.S. Cl.
CPC ........................ *G05B 9/02* (2013.01)

(58) Field of Classification Search
CPC ....................... G05B 9/02; F16P 3/08
See application file for complete search history.

(56) References Cited

U.S. PATENT DOCUMENTS

| | | | | |
|---|---|---|---|---|
| 5,184,855 A * | 2/1993 | Waltz | ................. | E05C 19/168 |
| | | | | 292/341.16 |
| 6,135,515 A * | 10/2000 | Roth | ................. | E05C 19/166 |
| | | | | 292/DIG. 55 |
| 10,948,892 B2 | 3/2021 | Babasaki et al. | | |
| 11,321,055 B2 * | 5/2022 | Kawanaka | ............. | G06F 8/313 |
| 11,321,056 B2 * | 5/2022 | Kawanaka | ............. | G06F 8/33 |
| 11,408,560 B2 * | 8/2022 | Miyake | ............. | F16P 3/142 |
| 11,698,618 B2 * | 7/2023 | Kudo | ............. | F16P 3/144 |
| | | | | 700/28 |
| 2008/0094158 A1 * | 4/2008 | Schmid | ............. | H01H 27/002 |
| | | | | 335/291 |
| 2020/0057423 A1 * | 2/2020 | Babasaki | ............. | G05B 19/058 |

FOREIGN PATENT DOCUMENTS

JP      2020027772 A      2/2020

OTHER PUBLICATIONS

U.S. Appl. No. 18/229,183, filed Aug. 2, 2023 (82 pages).
U.S. Appl. No. 18/229,184, filed Aug. 2, 2023 (54 pages).
U.S. Appl. No. 18/229,185, filed Aug. 2, 2023 (101 pages).

* cited by examiner

*Primary Examiner* — Jared Fureman
*Assistant Examiner* — Michael J Warmflash
(74) *Attorney, Agent, or Firm* — Kilyk & Bowersox, P.L.L.C.

(57) ABSTRACT

Wiring work without requiring a safety PLC is simplified even when a plurality of safety switches having a lock function are arranged. The plurality of safety switches are cascade-connected to a wiring unit. The wiring unit supplies power received via the power input unit (a VCC terminal or a GND terminal) to the plurality of safety switches. The wiring unit performs through-output of an OSSD input received from the most downstream safety switch to the outside of the wiring unit. The wiring unit outputs upstream-facing communication data COM (a lock input or the like) based on a lock instruction (LOCK). The wiring unit receives downstream-facing communication data COM (such as bundle data of AUX outputs) and outputs the communication data COM as individual AUX outputs.

18 Claims, 10 Drawing Sheets

WIRING UNIT, SERIAL CASCADE CONNECTOR SYSTEM

CROSS-REFERENCE TO RELATED APPLICATIONS

The present application claims foreign priority based on Japanese Patent Application No. 2022-127765, filed Aug. 10, 2022, the contents of which are incorporated herein by reference.

BACKGROUND OF THE INVENTION

1. Field of the Invention

The invention relates to a wiring unit and a serial cascade connector system for a serial cascade connection of a plurality of safety switches.

2. Description of Related Art

A safety switch (also referred to as a safety door switch or a safety door sensor) has been known as one of safety components for protecting a worker from hazard sources such as a press device and a work robot. Note that a plurality of safety switches are often coupled using a serial cascade connector system from the viewpoint of wire saving in a case where the plurality of safety switches are installed for one hazard source.

FIG. 10 is a diagram illustrating one conventional example of the serial cascade connector system. A serial cascade connector system 100 of this conventional example includes a plurality of (eight in this drawing) safety switches 110(1) to 110(8), a power unit 120, a safety controller 130, and a non-safety controller 140.

Note that, in a case where matters common to the safety switches 110(1) to 110(8) are described, numerals in parentheses such as (1) to (8) following reference numerals can be omitted.

The safety switch 110 includes six ports of a power terminal P11 (VCC), a ground terminal P12 (GND), output signal switching device [OSSD] output terminals P13 and P14 (OSSD1_O and OSSD2_O), a lock input terminal P17 (LOCK), and an AUX output terminal P18 (AUX).

Note that an OSSD output is a safety output used to notify that a hazard source is in a safe state. A lock input is a control input for driving a lock portion of the safety switch 110. An AUX output is a non-safety output (=an output signal other than the OSSD output) used to display a state of the safety switch 110.

Furthermore, it is necessary to provide OSSD input terminals P15 and P16 (OSSD1_I and OSSD2_I) in addition to the above six ports in order to serially cascade-connect the plurality of safety switches 110. An OSSD input corresponds to a safety input for receiving the OSSD output that is output from an upstream-side safety switch.

Note that JP 2020-27772 A can be cited as an example of the related art related to the above.

By performing the above cascade connection, the number of wires for transmitting the OSSD output is integrated into one (in FIG. 10, two wires for duplexing).

Therefore, the number of wires input to the safety controller 130 can be reduced with respect to the total number of safety switches 110.

Meanwhile, the main object of the conventional cascade connection is to associate the safety outputs of the plurality of safety switches 110 (for example, when a safety output of an upstream-side safety switch is OFF, a downstream-side safety switch that receives the safety output of the upstream-side safety switch outputs OFF as a safety output regardless of a determination result of the own switch). Therefore, a connection destination of each of them is changed from the safety controller 130 to the adjacent safety switch 110 regarding a wire for transmitting the OSSD output, but separate connections to a device that outputs the lock input to the safety switch 110 and a device that receives the AUX output of the safety switch 110 are required regarding the lock input and the AUX output. Therefore, there is a problem that wires, similar to those for direct connections to the respective safety switches 110 without using the cascade connection, are required.

Further, as a method for reducing wires directly connected to the safety switches 110, it is also possible to consider a configuration using a safety controller or a safety programmable logic controller (PLC) known as a device having a function capable of transmitting and receiving a plurality of inputs and outputs to and from a specific safety switch 110 through one communication line. However, in order to use the safety PLC, for example, a user needs to program how to interpret and display information acquired from the communication line. Therefore, work for achieving a ready-for-use state is separately generated although work related to connecting wires itself is reduced. Further, there is a problem that a safety parameter in the entire safety system decreases because the OSSD output is also transmitted to the safety PLC. In addition, cost of the entire safety system increases because the safety PLC is expensive. Furthermore, there is also a problem that versatility is low because a combination of the safety PLC and the safety switch is limited to specific machine types.

Furthermore, the related art of JP 2020-27772 A discloses, for example, a configuration in which input/output systems corresponding to input/output systems (terminals) of AUX outputs of safety switches are provided, respectively, and a cable bundling the systems is used to simplify wiring work of a safety switch not having a lock function. In this related art, however, one safety switch corresponds to one input/output system in each of the input/output systems. That is, the number of poles of the cable and a connector is limited. Therefore, a safety switch having a lock function that requires a lock input cannot be a connection target. Further, the number of safety switches whose state detection and the like with the AUX output are possible is limited by the number of poles of the cable and the connector. In particular, if an input/output system for the lock input is separately provided, two input/output systems of the AUX output and the lock input are required for one safety switch, and thus, the number of connectable safety switches is easily limited by the number of poles of the cable and the connector.

SUMMARY OF THE INVENTION

In view of the above problems, an object of the invention is to provide a wiring unit capable of simplifying wiring work without requiring a safety PLC even when a plurality of safety switches having a lock function are arranged, and a serial cascade connector system using the wiring unit.

According to one embodiment of the invention, a wiring unit to which a plurality of safety switches each including an actuator and a switch body that detects the actuator are connected in a cascade connection, the wiring unit includes:

a power input unit configured to receive power;

a safety switch port that includes a pair of safety input terminals receiving a first safety signal, which is a pair of safety signals output by a first safety switch among the plurality of safety switches connected in a cascade, a pair of power output terminals configured to supply power received via the power input unit to the plurality of safety switches, and a wiring unit communication terminal configured to perform bidirectional communication with the first safety switch;

a safety output unit internally connected to the pair of safety input terminals to through-output the first safety signal received via the pair of safety input terminals;

a lock instruction input unit that receives a lock instruction for locking a safety switch capable of locking movement of the actuator with respect to the switch body in response to an instruction among the plurality of safety switches;

an information output unit configured to individually output information indicating a state of each of the plurality of safety switches; and a wiring unit MCU that individually outputs information indicating a state of each of the plurality of safety switches based on information from the plurality of safety switches received via the wiring unit communication terminal, and outputs a lock input for instructing locking based on the lock instruction received via the lock instruction input unit to the safety switch capable of the locking, the safety output unit being internally connected to the pair of safety input terminals to enable failure sensing by a failure sensing function of the first safety switch.

According to one embodiment of the invention, a serial cascade connector system includes:

a first safety switch and a second safety switch as safety switches each including an actuator and a switch body that detects the actuator; and a wiring unit to which the first safety switch and the second safety switch are connected in a cascade connection, at least one of the first safety switch and the second safety switch being a lockable safety switch including a lock portion capable of locking movement of the actuator in response to a lock input, the first safety switch including:

a pair of first safety input terminals configured to receive a second safety signal that is a pair of safety signals output from the second safety switch;

a pair of first safety output terminals configured to output a first safety signal, which is a pair of safety signals, to the wiring unit;

a first terminal configured to perform bidirectional communication with the second safety switch;

a second terminal configured to perform bidirectional communication with the wiring unit;

a detection unit detecting that the actuator is within a predetermined range with respect to the switch body;

a safety switch MCU that outputs the first safety signal based on the second safety signal received via the first safety input terminals and a detection result obtained by the detection unit, and outputs, via the second terminal, information indicating states of the first safety switch and the second safety switch based on information indicating the state of the second safety switch received via the first terminal; and a failure sensing unit that senses a failure of the first safety switch, the wiring unit including:

a safety switch port that includes a pair of safety input terminals receiving the first safety signal, a power input unit configured to receive power, a pair of power output terminals configured to supply the power received via the power input unit to the first safety switch and the second safety switch, and a wiring unit communication terminal configured to perform bidirectional communication with the first safety switch;

a safety output unit that is internally connected to the pair of safety input terminals to perform through-output of the first safety signal received via the safety input terminals;

a lock instruction input unit that receives a lock instruction for locking the lockable safety switch;

an information output unit configured to individually output the information indicating the state of each of the plurality of safety switches; and a wiring unit MCU that individually outputs the information indicating the state of the first safety switch and the information indicating the state of the second safety switch based on information received via the wiring unit communication terminal, and outputs the lock input for instructing locking based on the lock instruction received via the lock instruction input unit to the lockable safety switch via the wiring unit communication terminal, and the safety output unit being internally connected to the pair of safety input terminals to enable sensing of a failure by a failure sensing unit included in the first safety switch at a destination where the first safety signal received from the through-output performed by the safety output unit.

Note that other features, elements, steps, advantages, and characteristics will be more apparent from the following detailed description of preferred embodiments and the accompanying drawings.

According to the invention, it is possible to provide the serial cascade connector system capable of simplifying the wiring work without requiring the safety PLC even when the plurality of safety switches having the lock function are arranged.

DETAILED DESCRIPTION OF PREFERRED EMBODIMENTS

<Serial Cascade Connector System (First Embodiment)>

Figure 1:
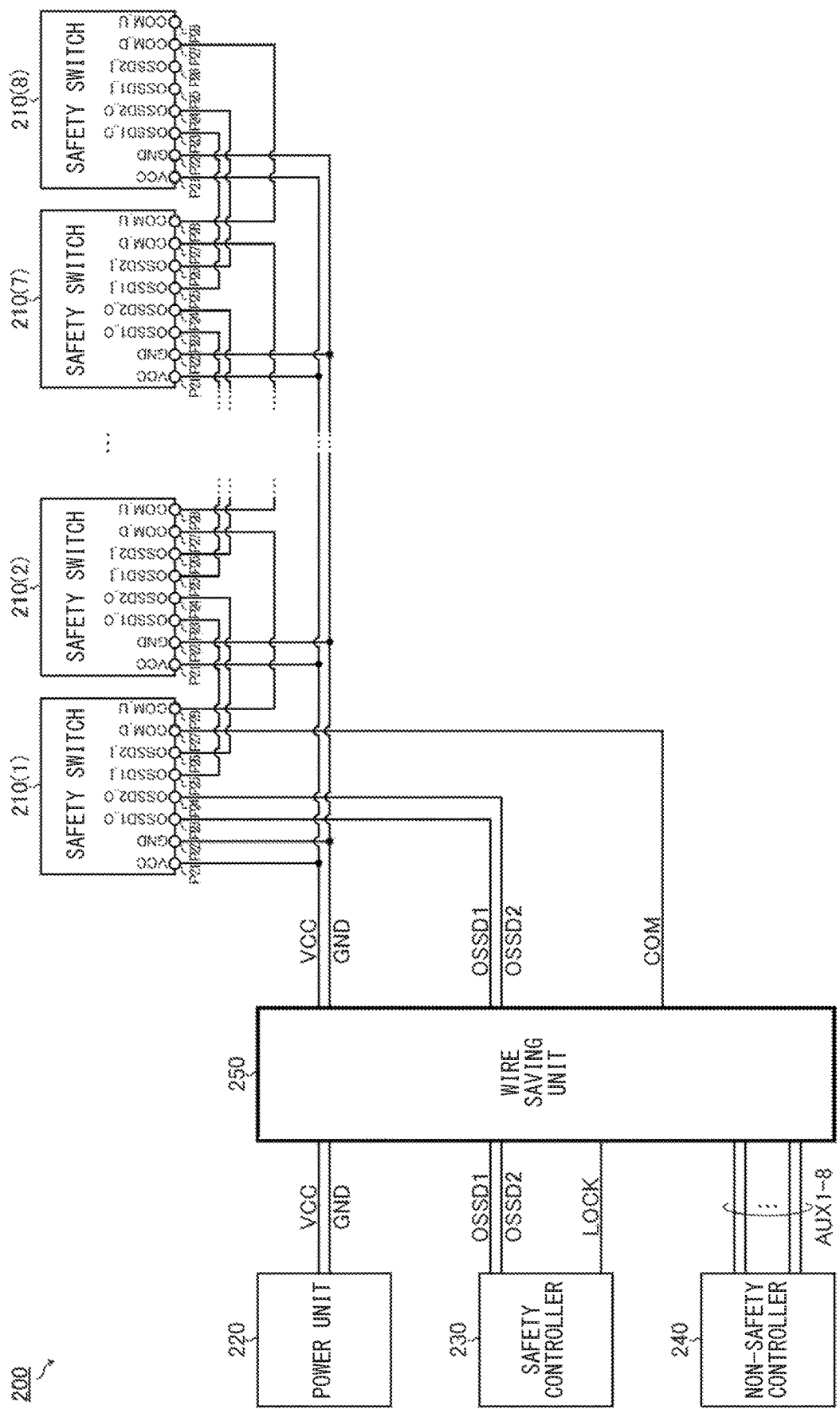
FIG. 1 is a diagram illustrating a first embodiment of a serial cascade connector system.

FIG. 1 is a diagram illustrating a first embodiment of a serial cascade connector system. A serial cascade connector system 200 of the first embodiment includes a plurality of (eight in this drawing) safety switches 210(1) to 210(8), a power unit 220, a safety controller 230, a non-safety controller 240, and a wire saving unit 250.

Note that, in a case where matters common to the safety switches 210(1) to 210(8) are described, numerals in parentheses such as (1) to (8) following reference numerals can be omitted.

The safety switch 210 includes eight ports of a power terminal P21 (VCC), a ground terminal P22 (GND), OSSD output terminals P23 and P24 (OSSD1_O and OSSD2_O), OSSD input terminals P25 and P26 (OSSD1_I and OSSD2_I), a downstream communication terminal P27 (COM_D), and an upstream communication terminal P28 (COM_U).

Note that each of the safety switches 210 includes a switch body and an actuator (none of which are illustrated), and is arranged so as to detect an open or closed state of each corresponding door. Further, at least one of the safety switches 210(1) to 210(8) includes a lock portion (such as an electromagnet) that can lock movement of the actuator in response to a lock input.

Among the safety switches 210(1) to 210(8), the most upstream safety switch 210(8) sends an OSSD output to the safety switch 210(7) connected to the downstream side of the own switch based on the open or closed state of the door corresponding to the own switch.

Each of the intermediate safety switches 210(0 (where i=2, 3, ..., 7) receives, as an OSSD input, an OSSD output that is output from the safety switch 210(i+1) connected to the upstream side of the own switch, and sends an OSSD output to the safety switch 210(i−1) connected to the downstream side of the own switch based on the OSSD input and the open or closed state of the door corresponding to the own switch.

The most downstream safety switch 210(1) receives, as an OSSD input, the OSSD output that is output from the safety switch 210(2) connected to the upstream side of the own switch, and sends an OSSD output to the wire saving unit 250 connected to the downstream side of the own switch based on the OSSD input and the open or closed state of the door corresponding to the own switch.

Note that the OSSD output from the safety switch 210(1) to the wire saving unit 250 is set to an ON signal (=operation permission signal) when all the corresponding doors of the safety switches 210(1) to 210(8) are closed, and is set to an OFF signal (=operation non-permission signal) when at least one of the doors is not closed.

Figure 10:
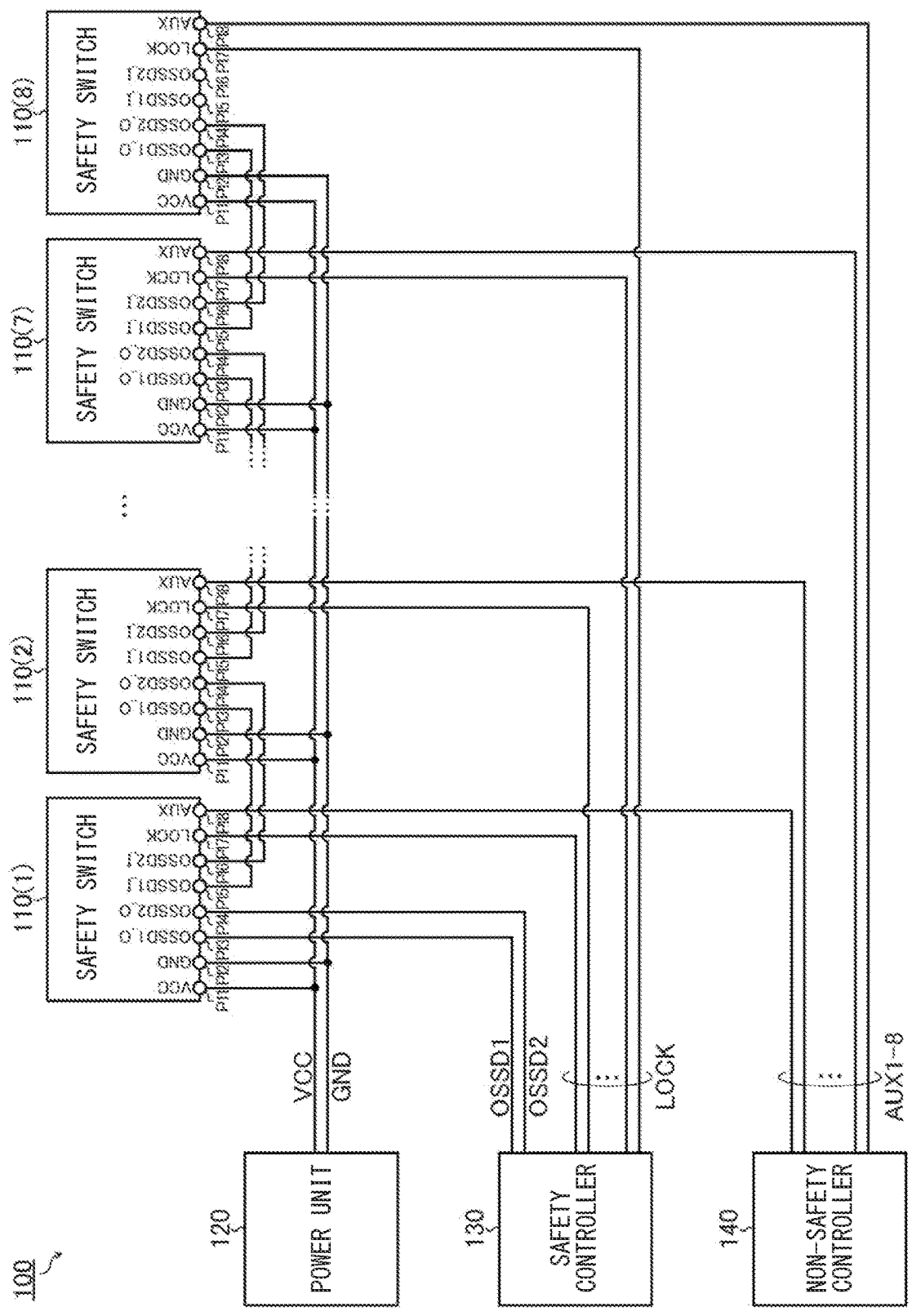
FIG. 10 is a diagram illustrating a conventional example of the serial cascade connector system.

Further, the most downstream safety switch 210(1) performs bidirectional communication with the wire saving unit 250 connected to the downstream communication terminal P27 (COM_D), and performs bidirectional communication with the safety switch 210(2) connected to the upstream communication terminal P28 (COM 13). Similarly, each of the intermediate safety switches 210(i) performs bidirectional communication with the safety switch 210(i−1) connected to the downstream communication terminal P27 (COM_D), and performs bidirectional communication with the safety switch 210(i+1) connected to the upstream communication terminal P28 (COM 13). In the bidirectional communication described above, an AUX output and a lock input in the conventional example (FIG. 10) are transmitted and received as communication data.

When focusing on the AUX output, the most upstream safety switch 210(8) outputs the AUX output based on the open or closed state, the locked state, an error state, and the like of the door corresponding to the own switch as downstream-facing communication data. The safety switch 210(7) on the immediately downstream side superimposes its own AUX output on the communication data from the upstream side and outputs the communication data to the downstream side. Thereafter, similar signal processing is performed. As a result, downstream-facing communication data output from the most downstream safety switch 210(1) to the wire saving unit 250 includes contents in which all the AUX outputs of the safety switches 210(1) to 210(8) are bundled into one.

The safety switch 210(1) corresponds to a "first safety switch". The safety switch 210(2) connected to the upstream side of the safety switch 210(1) corresponds to a "second safety switch". The wire saving unit 250 connected to the downstream side of the safety switch 210(1) corresponds to a "wiring unit". The safety controller 230 connected to the wire saving unit 250 corresponds to a "safety control apparatus".

The OSSD outputs (OSSD1_O and OSSD2_O) output from the safety switch 210(1) to the wire saving unit 250 correspond to a "first safety signal". The OSSD inputs (OSSD1_I and OSSD2_I) input from the safety switch 210(2) to the safety switch 210(1) correspond to a "second safety signal".

The communication data output from the safety switch 210(1) to the wire saving unit 250, that is, communication data in which the AUX outputs (AUX1 to AUX8) respectively indicating the states of the safety switches 210(1) to 210(8) are bundled into one corresponds to "first state information". The communication data output from the safety switch 210(2) to the safety switch 210(1), that is, communication data in which the AUX outputs (AUX2 to AUX8) respectively indicating the states of the safety switches 210(2) to 210(8) are bundled into one corresponds to "second state information".

In the safety switch 210(1), the OSSD input terminals P25 and P26 (OSSD1_I and OSSD2_I) correspond to a "first safety input terminal" configured to receive the OSSD input from the safety switch 210(2). The OSSD output terminals P23 and P24 (OSSD1_O and OSSD2_O) correspond to a "first safety output terminal" configured to output the OSSD output to the wire saving unit 250.

Further, in the safety switch 210(1), the upstream communication terminal P28 (COM_U) corresponds to an "upstream communication terminal" configured to receive the downstream-facing communication data (=AUX output) from the safety switch 210(2) and to output upstream-facing communication data (=lock input) to the safety switch 210(2). On the other hand, the downstream communication terminal P27 (COM_D) corresponds to a "downstream communication terminal" configured to receive the upstream-facing communication data (=lock input) from the wire saving unit 250 and to output the downstream-facing communication data (=AUX output) to the wire saving unit 250.

The wire saving unit 250 is provided between the most downstream safety switch 210(1), and each of the power unit 220, the safety controller 230, and the non-safety controller 240.

The wire saving unit 250 operates by receiving supply of an input voltage VCC and a ground voltage GND from the power unit 220. Note that the wire saving unit 250 also functions as a power supply path from the power unit 220 to the safety switches 210(1) to 210(8).

Further, the wire saving unit 250 performs through-output of the OSSD outputs (OSSD1 and OSSD2) received from the safety switch 210(1) to the safety controller 230. Note that the "through-output" here means that no logic processing is performed on the OSSD output. That is, it can be understood that the wire saving unit 250 performs "through-output" of the OSSD output even in a case where a buffer is provided on a signal path through which the OSSD output is transmitted, or even in a case where a bias is applied to the OSSD output.

Further, the wire saving unit 250 receives a lock instruction (LOCK) from the safety controller 230, and outputs upstream-facing communication data (=lock input) to the safety switch 210(1) based on the lock instruction (LOCK). Note that the lock input described above is sequentially transmitted from the most downstream safety switch 210(1) to the most upstream safety switch 210(8). Therefore, among the safety switches 210(1) to 210(8), those including the lock portion (such as the electromagnet) can lock the movement of the actuator in response to the lock input.

Furthermore, the wire saving unit 250 receives downstream-facing communication data (=bundle data of AUX outputs) from the safety switch 210(1), separates this into the individual AUX outputs (AUX1 to AUX8), and outputs the individual AUX outputs to the non-safety controller 240. Therefore, the non-safety controller 240 can individually grasp the state of each of the safety switches 210(1) to 210(8).

In this manner, in the serial cascade connector system 200 of the present embodiment, as in the above-described conventional example (FIG. 10), the number of wires for transmitting the OSSD output is integrated into one (in FIG. 1, two wires for duplexing).

Further, the wire saving unit 250 has a function of performing bidirectional communication with the safety switch 210(1) (eventually, all the safety switches 210(1) to 210(8)) via a single communication line. That is, in the above-described conventional example (FIG. 10), sixteen (=LOCK×8+AUX×8) wires, laid between each of the safety controller 130 and the non-safety controller 140 and the safety switches 110(1) to 110(8), are integrated into one.

Therefore, the number of wires input to the wire saving unit 250 can be reduced with respect to the total number of the safety switches 210(1) to 210(8). As a result, wiring work for collectively controlling the safety switches 210(1) to 210(8) can be simplified.

Further, the serial cascade connector system 200 of the present embodiment does not require a safety controller or a safety PLC having a function of communicating with a specific sensor. In a case where the safety PLC is introduced instead of the safety controller 230 and the non-safety controller 240, it is necessary to program how to process signals from devices to be controlled (here, the safety switches 210(1) to 210(8)) by the safety PLC.

On the other hand, what kind of signal input/output processing (and display processing) needs to be performed between the safety switches 210(1) to 210(8) and each of the safety controller 230 and the non-safety controller 240 is set in advance in the wire saving unit 250 (particularly, an MCU built therein). Therefore, the safety controller 230 and the non-safety controller 240 can operate as if the safety switches 210(1) to 210(8) are directly connected to each of the safety controller 230 and the non-safety controller 240.

Further, in a case where the safety PLC is introduced instead of the safety controller 230 and the non-safety controller 240, an OSSD output (safety output) is input to the safety PLC in addition to an AUX output (non-safety output). In other words, the safety PLC intervenes in a signal system for transmission and reception of the OSSD output (safety output). In a safety system including a plurality of safety devices, a safety parameter of the entire safety system is evaluated based on failure rates of the respective safety devices constituting the safety system. Therefore, it can be said that the safety parameter is greatly affected when the safety PLC having a complicated function is incorporated in the safety system.

On the other hand, the wire saving unit 250 is not a device that performs reception and transmission after performing some logic processing on the OSSD output like the safety PLC, but performs the through-output of the OSSD outputs (OSSD1 and OSSD2), input from the safety switch 210(1), directly to the safety controller 230. Therefore, even if the wire saving unit 250 is incorporated in the safety system, the influence on the safety parameter can be suppressed to the minimum. Further, as described later, the safety switch 210 can sense a failure occurring in the own switch and reflect such a failure sensing result in the OSSD output. Therefore, a failure sensing function of the safety switch 210 can be directly utilized.

Further, in the serial cascade connector system 200 of the present embodiment, it is possible to detect the states of the safety switches more than the number of input/output systems (terminals) of the AUX output, which is different from the related art disclosed in JP 2020-27772 A.

Note that it is sufficient for the number of signal lines connecting the safety switch 210(1) and the wire saving unit 250 to be five or less as illustrated in this drawing. Therefore, it is possible to use a general-purpose M12 connector cable.

<Consideration Regarding Lock Timing>

Meanwhile, in the serial cascade connector system 200 of the present embodiment, the lock input is transmitted to each of the safety switches 210(1) to 210(8) through the upstream-facing communication data output from the safety controller 230.

At this time, if all of locks of the safety switches 210(1) to 210(8), which are input targets, operate simultaneously, depending on specifications of devices, an excessive current flows through a power line, or a normal operation cannot be performed due to a voltage drop in a cable resistor. In view of this, lock timings of the safety switches 210(1) to 210(8) are preferably controlled to be shifted from each other.

That is, the serial cascade connector system 200 is preferably configured such that a lock input for driving the lock portion of the upstream-side safety switch 210(2) is input to the safety switch 210(2) with a time difference at a timing different from a timing at which the lock portion in the downstream-side safety switch 210(1) is driven when the wire saving unit 250 receives the lock instruction (LOCK) from the safety controller 230. The same applies to the safety switches 210(3) to 210(8) further provided on the upstream side.

For example, a case where a batch of lock instruction bits is included in upstream-facing communication data output from the wire saving unit 250 is considered. In this case, unless some measures are taken, all the locks of the safety switches 210(1) to 210(8) can be operated almost at the same time.

Therefore, a delay function of a lock instruction bit may be incorporated in at least one of the safety switches 210(1) to 210(7) other than the most upstream side. As a technique for realizing this delay function, for example, a lock operation of the own switch may be started at a time point when it is recognized that the lock instruction bit is set to transmit a temporarily cleared lock instruction to the upstream side of the own switch, and then, a lock instruction bit may be set again and transmitted to the upstream side of the own switch at a time point when the lock operation of the own switch is completed. According to such a delay function, a timing at which the lock instruction bit is transmitted to the upstream side can be delayed, the lock timings of the safety switches 210(1) to 210(8) can be shifted from each other.

<Serial Cascade Connector System (Second Embodiment)>

Figure 2:
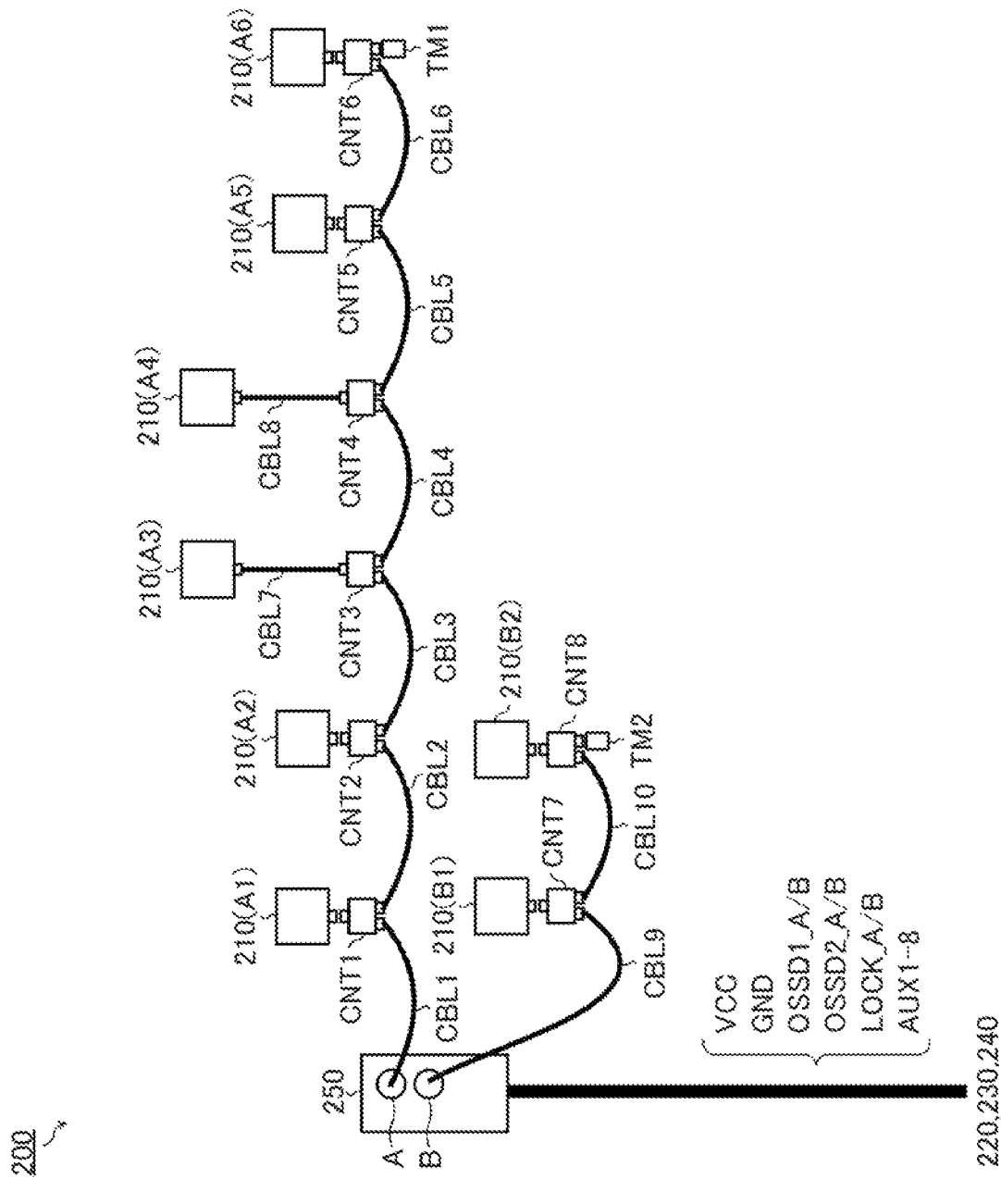
FIG. 2 is a diagram illustrating a second embodiment of the serial cascade connector system.

FIG. 2 is a diagram illustrating a second embodiment of the serial cascade connector system. The serial cascade connector system 200 of the present embodiment includes the wire saving unit 250 provided with a plurality of systems of ports (two systems of a port A and a port B in this drawing) with the configuration of the above-described first embodiment (FIG. 1) as a base.

Six safety switches 210(A1) to 210(A6) are serially cascade-connected to the port A of the wire saving unit 250 via connectors CNT1 to CNT6 and cables CBL1 to CBL8. Note that each of the connectors CNT1 to CNT6 includes a downstream-side socket, an upstream-side socket, and a switch-side socket.

The port A of the wire saving unit 250 is connected to the downstream-side socket of the connector CNT1 via the cable CBL1. The upstream-side socket of the connector CNT1 is connected to the downstream-side socket of the connector CNT2 via the cable CBL2. The upstream-side socket of the connector CNT2 is connected to the downstream-side socket of the connector CNT3 via the cable CBL3. The upstream-side socket of the connector CNT3 is connected to the downstream-side socket of the connector CNT4 via the cable CBL4. The upstream-side socket of the connector CNT4 is connected to the downstream-side socket of the connector CNT5 via the cable CBL5. The upstream-side socket of the connector CNT5 is connected to the downstream-side socket of the connector CNT6 via the cable CBL6. The upstream-side socket of the connector CNT6 is connected to a terminator TM1 (also referred to as a termination resistor or a dummy load).

The switch-side sockets of the connectors CNT1, CNT2, CNT5, and CNT6 are directly connected to the safety switches 210(A1), 210(A2), 210(A5), and 210(A6), respectively. Note that each of the safety switches 210(A1), 210(A2), 210(A5), and 210(A6) includes a lock portion using an electromagnet. Therefore, the safety switches 210 (A1), 210(A2), 210(A5), and 210(A6) can implement door locking in response to a lock input transmitted from the wire saving unit 250.

The switch-side socket of the connector CNT3 is connected to the safety switch 210(A3) via the cable CBL7. The switch-side socket of the connector CNT4 is connected to the safety switch 210(A4) via the cable CBL8. Note that the safety switch 210(A3) includes a lock portion using a spring lock. On the other hand, the safety switch 210(A4) does not include any lock portion. Therefore, the safety switches 210(A3) and 210(A4) are not capable of implementing door locking even if receiving the lock input transmitted from the wire saving unit 250.

Two safety switches 210(B1) and 210(B2) are serially cascade-connected to the port B of the wire saving unit 250 via connectors CNT7 and CNT8 and cables CBL9 and CBL10, respectively. Note that each of the connectors CNT7 and CNT8 includes a downstream-side socket, an upstream-side socket, and a switch-side socket.

The port B of the wire saving unit 250 is connected to the downstream-side socket of the connector CNT7 via the cable CBL9. The upstream-side socket of the connector CNT7 is connected to the downstream-side socket of the connector CNT8 via the cable CBL10. The upstream-side socket of the connector CNT8 is connected to a terminator TM2.

The switch-side sockets of the connectors CNT7 and CNT8 are directly connected to the safety switches 210(B1) and 210(B2), respectively. Each of the safety switches 210(B1) and 210(B2) includes a lock portion using an electromagnet. Therefore, the safety switches 210(B1) and 210(B2) can implement door locking in response to the lock input transmitted from the wire saving unit 250.

As described above, the maximum of eight safety switches in total can be connected to the ports A and B of the wire saving unit 250 in the serial cascade connector system 200 of the present embodiment. That is, in a case where x (where $0 \leq x \leq 8$) safety switches are connected to the port A, the maximum of (8−x) safety switches can be connected to the port B.

The wire saving unit 250 operates by receiving supply of an input voltage VCC and a ground voltage GND from the power unit 220. Note that the wire saving unit 250 also functions as a power supply path from the power unit 220 to each of the ports A and B.

Further, the wire saving unit 250 performs through-output of OSSD outputs (OSSD1_A/B and OSSD2_A/B), input from the safety switches 210(A1) and 210(B1) to the ports A and B, respectively, to the safety controller 230.

Further, the wire saving unit 250 receives two systems of lock instructions (LOCK_A/B) from the safety controller 230, and outputs the lock instructions to the safety switches 210(A1) and 210(B1) from the ports A and B, respectively, as upstream-facing communication data.

Furthermore, the wire saving unit 250 receives downstream-facing communication data input to each of the ports A and B from the safety switches 210(A1) and 210(B1), separates this into individual AUX outputs (AUX1 to AUX8), and outputs the individual AUX outputs to the non-safety controller 240.

As described above, the wire saving unit 250 basically operates similarly to that of the first embodiment (FIG. 1) except that the two systems of the ports A and B are included. Therefore, it is possible to simplify wiring work for collectively controlling the safety switches 210(A1) to 210(A6), 210(B1), and 210(B2).

Figure 3:
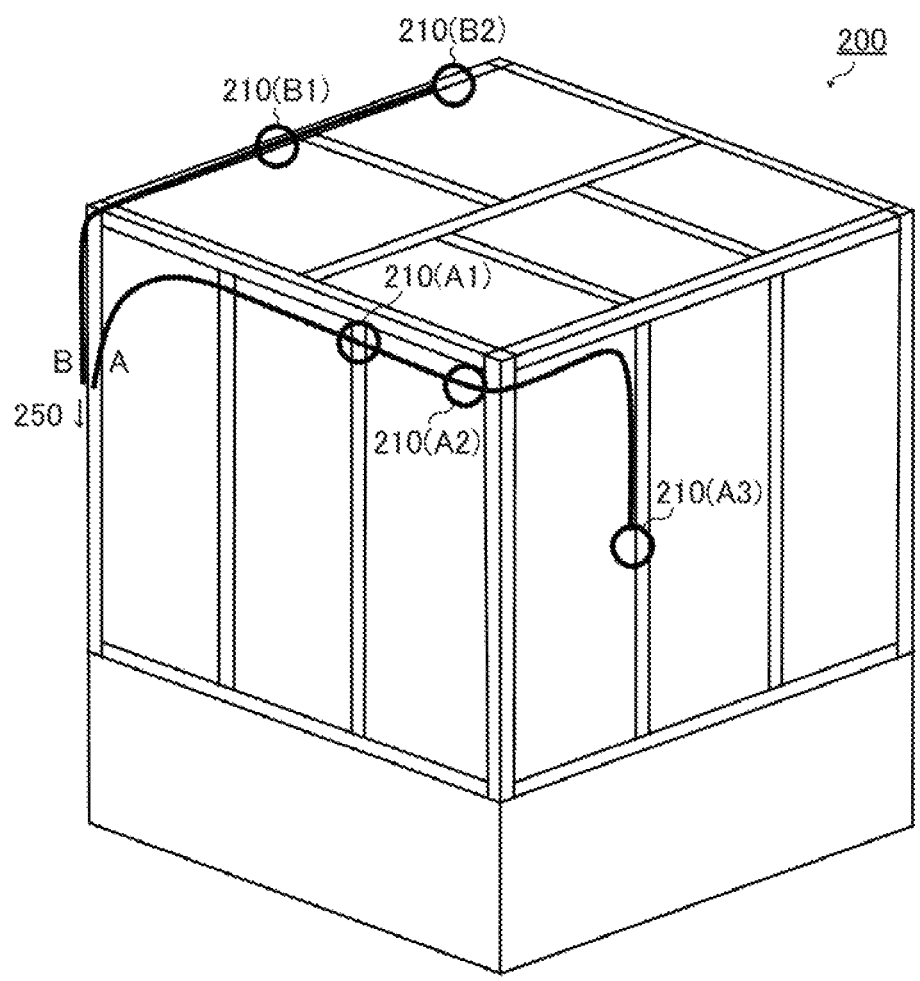
FIG. 3 is a view illustrating an application example of the serial cascade connector system.

FIG. 3 is a diagram illustrating an application example of the serial cascade connector system 200 according to the second embodiment. As illustrated in this drawing, a case in which four sides of a hazard source (such as a machine tool) are surrounded by isolation walls, and a plurality of doors are provided on different side surfaces, respectively, is considered. In this case, it can be said that wires for safety switches respectively provided on the doors desirably branch into a plurality of systems from the wire saving unit 250 in terms of wiring work.

With reference to this drawing, the safety switches 210 (A1) to 210(A3) arranged on the isolation wall on the front side on the paper surface are cascade-connected to the port A of the wire saving unit 250. On the other hand, the safety switches 210(B1) and 210(B2) arranged on the isolation wall on the back side of the paper surface are cascade-connected to the port B of the wire saving unit 250.

Further, in addition to the above-described wiring reason, there may be a case where it is desired to individually set input/output control (for example, lock control) of each of safety switches provided in each of a door for workers and a door for maintenance. For this purpose, the wire saving unit 250 desirably includes a plurality of systems of ports with the OSSD output and the lock input being independent for each of the systems.

<Wire Saving Unit>

Figure 4:
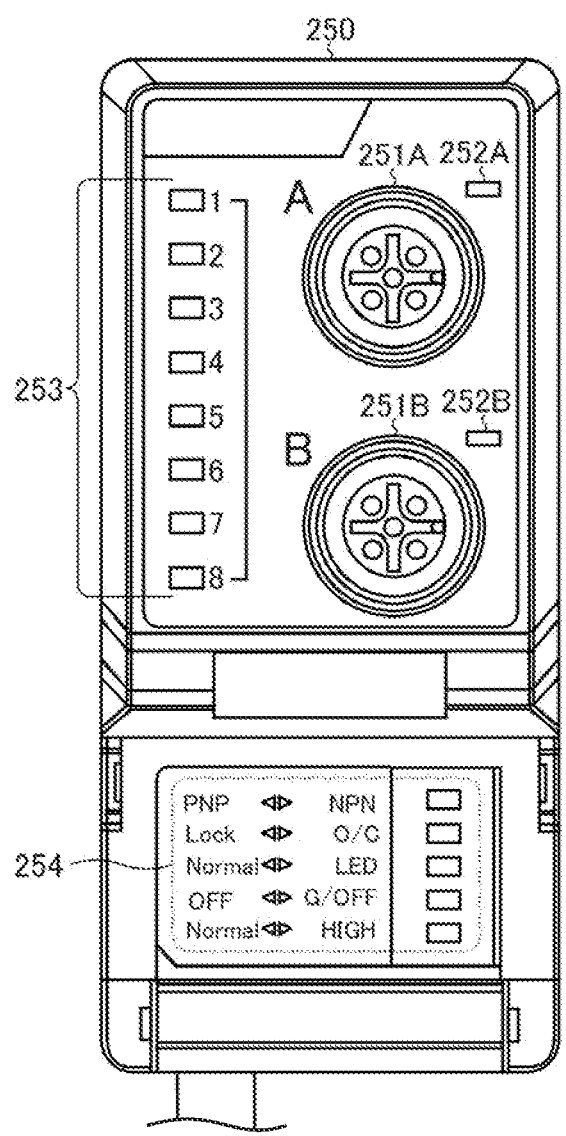
FIG. 4 is a view illustrating an appearance of a wire saving unit.

FIG. 4 is a view illustrating an appearance of the wire saving unit 250 according to the second embodiment. With reference to this drawing, the wire saving unit 250 includes switch connection connectors 251A and 251B, OSSD indicator lamps 252A and 252B, switch state indicator lamps 253, and setting changeover switches 254.

The switch connection connector 251A is a connector corresponding to the port A. As illustrated in FIG. 2, the cable CBL1 is connected to the switch connection connector 251A. For example, the switch connection connector 251A may be provided on the right side of an upper region in a front view of the wire saving unit 250 as illustrated in this drawing.

The switch connection connector 251B is a connector corresponding to the port B. As illustrated in FIG. 2, the cable CBL9 is connected to the switch connection connector 251B. For example, the switch connection connector 251B may be provided below the switch connection connector 251A in the front view of the wire saving unit 250 as illustrated in this drawing. In the present embodiment, the port A and the port B are configured using the switch connection connector 251A and the switch connection connector 251B, respectively, provided in a housing of the wire saving unit 250, but may be configured using connectors provided at a tip of a cable by providing the cable that extends from the inside to the outside of the housing of the wire saving unit 250.

The OSSD indicator lamp 252A is turned on and off according to the OSSD outputs of the safety switches 210 cascade-connected to the port A. According to FIG. 2, the OSSD indicator lamp 252A is lit in green when all the OSSD outputs of the safety switches 210(A1) to 210(A6) are ON, and is turned off when at least one of them is OFF. For example, the OSSD indicator lamp 252A may be provided at an upper right corner of the switch connection connector 251A in the front view of the wire saving unit 250 as illustrated in this drawing.

The OSSD indicator lamp 252B is turned on and off according to the OSSD outputs of the safety switches 210 cascade-connected to the port B. According to FIG. 2, the OSSD indicator lamp 252B is lit in green when all the OSSD outputs of the safety switches 210(B1) and 210(B2) are ON, and is turned off when at least one of them is OFF. For example, the OSSD indicator lamp 252B may be provided at an upper right corner of the switch connection connector 251B in the front view of the wire saving unit 250 as illustrated in this drawing.

The switch state indicator lamps 253 display states of the maximum of eight safety switches 210, respectively, based on the downstream-facing communication data (=bundle data of the AUX output) input to each of the ports A and B. For example, eight switch state indicator lamps 253 may be vertically aligned in an array on the left side of the upper region (=the left side of each of the switch connection connectors 251A and 251B) in the front view of the wire saving unit 250 as illustrated in this drawing.

Note that the eight aligned switch state indicator lamps 253 correspond to the safety switches 210 connected to the port A in order from the top, and the safety switches 210 connected to the port B in order from the bottom. According to FIG. 2, among the eight switch state indicator lamps 253, six in order from the top indicate the states of the safety switches 210(A1) to 210(A6), and two in order from the bottom indicate the states of the safety switches 210(B1) and 210(B2). With such an array, it is easy to distinguish state displays of the safety switches 210(A1) to 210(A6), 210(B1), and 210(B2) connected to the ports A and B with the minimum number of indicator lamps.

The correspondence relationship between an on/off state of the switch state indicator lamp 253 and the safety switch 210 is as follows. For example, when the safety switch 210 has detected and locked the actuator 212, the corresponding switch state indicator lamp 253 is lit in green. When the safety switch 210 has detected and unlocked the actuator 212, the corresponding switch state indicator lamp 253 blinks in green. When the safety switch 210 has not detected the actuator 212, the corresponding switch state indicator lamp 253 is lit in red. When the safety switch 210 is in an error state, the corresponding switch state indicator lamp 253 blinks in red. When the safety switch 210 is not connected, the switch state indicator lamp 253 is turned off.

In this manner, the switch state indicator lamp 253 has more display types (=lighting in green, blinking in green, lighting in red, blinking in red, and turning off) than the above-described OSSD indicator lamps 252A and 252B.

The setting changeover switch 254 is a switch configured to switch between various settings of each of the safety switches 210 cascade-connected to the ports A and B. For example, five setting changeover switches 254 may be aligned vertically in a lower region in the front view of the wire saving unit 250 as illustrated in this drawing.

Note that examples of setting parameters switchable by the setting changeover switch 254 include an OSSD output format (PNP/NPN), an OSSD output condition (linkage with locking/linkage with opening or closing), fixing turn-off of a large indicator lamp, turning off green of the large indicator lamp, and changeover of a latch force of an electromagnet lock. An input result of the setting changeover switch 254 may be included in the upstream-facing communication data output from the wire saving unit 250 as a setting changeover command.

Figure 5:
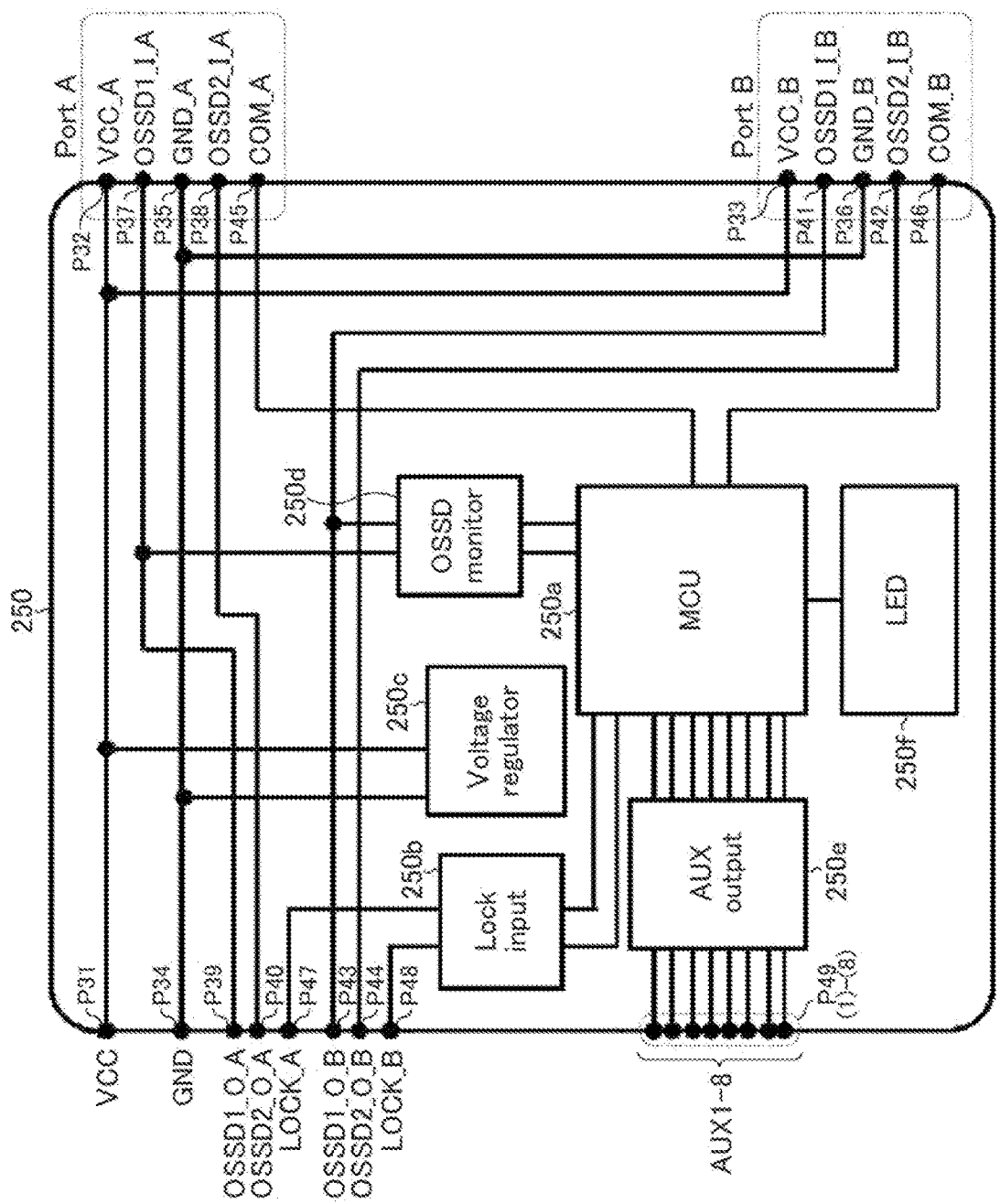
FIG. 5 is a diagram illustrating functional blocks of the wire saving unit.

FIG. 5 is a diagram illustrating functional blocks of the wire saving unit 250 according to the second embodiment. The wire saving unit 250 of the present configuration example includes a plurality of external terminals P31 to P48 and P49(1) to P49(8) (VCC, VCC_A, VCC_B, GND, GND_A, GND_B, OSSD1_I_A, OSSD2_I_A, OSSD1_O_A, OSSD2_O_A, OSSD1_I_B, OSSD2_I_B, OSSD1_O_B, OSSD2_O_B, COM_A, COM_B, LOCK_A, LOCK_B, and AUX1 to AUX8) as tools configured to establish electrical conduction with the outside of the unit.

The VCC terminal P31 is a power input terminal configured to receive the input voltage VCC from the power unit 220. The VCC_A terminal P32 is connected to the VCC terminal inside the wire saving unit 250, and is a power output terminal configured to output the input voltage VCC to the port A. The VCC_B terminal P33 is connected to the VCC terminal inside the wire saving unit 250, and is a power output terminal configured to output the input voltage VCC to the port B.

The GND terminal P34 is a ground input terminal configured to receive the ground voltage GND from the power unit 220. The GND_A terminal P35 is connected to the GND terminal inside the wire saving unit 250, and is a ground output terminal configured to output the ground voltage GND to the port A. The GND_B terminal P36 is connected to the GND terminal inside the wire saving unit 250, and is a ground output terminal configured to output the ground voltage GND to the port B. The VCC terminal P31 and the GND terminal P34 function as a power input unit that inputs power to the wire saving unit 250. Both the VCC terminal P31 and the GND terminal P34 are provided at a tip of a cable extending from the housing of the wiring unit 250. That is, the power input unit configured to input the power to the wiring unit 250 is the cable.

The OSSD1_I_A terminal P37 and the OSSD2_I_A terminal P38 are safety input terminals configured to receive the OSSD outputs (OSSD1 and OSSD2), respectively, of the safety switch 210 connected to the port A. The OSSD_O_A terminal P39 and the OSSD2_O_A terminal P40 are respectively connected to the OSSD1_I_A terminal and the OSSD2_I_A terminal inside the wire saving unit 250, and are safety output terminals configured to perform through-output of the OSSD output of the port A to the safety controller 230. The OSSD_O_A terminal P39 and the OSSD2_O_A terminal P40 are provided at a tip of a cable extending from the housing of the wiring unit 250. That is, a safety output unit configured to perform through-output of the OSSD output of the port A is the cable.

The OSSD1_I_B terminal P41 and the OSSD2_I_B terminal P42 are safety input terminals configured to receive the OSSD outputs (OSSD1 and OSSD2), respectively, of the safety switch 210 connected to the port B. The OSSD_O_B terminal P43 and the OSSD2_O_B terminal P44 are respectively connected to the OSSD_I_B terminal and the OSSD2_I_B terminal inside the wire saving unit 250, and are safety output terminals configured to perform through-output of the OSSD output of the port B to the safety controller 230. The OSSD_O_B terminal P43 and the OSSD2_O_B terminal P440 are provided at a tip of a cable extending from the housing of the wiring unit 250. That is, a safety output unit configured to perform through-output of the OSSD output of the port B is a cable.

The COM_A terminal P45 is a wiring unit communication terminal configured to receive downstream-facing communication data (=bundle data of AUX outputs in the port A) from the safety switches 210 connected to the port A and outputting upstream-facing communication data (=lock input of the port A).

The COM_B terminal P46 is a wiring unit communication terminal configured to receive downstream-facing communication data (=bundle data of AUX outputs in the port B) from the safety switches 210 connected to the port B and outputting upstream-facing communication data (=lock input of the port B).

The LOCK_A terminal P47 and the LOCK_B terminal P48 are lock instruction input terminals that receive the lock instructions of the ports A and B, respectively, from the safety controller 230. The LOCK_A terminal P47 and the LOCK_B terminal P48 are provided at a tip of a cable extending from the housing of the wiring unit 250. That is, a lock instruction input unit that receives the lock instructions is the cable.

The AUX1 terminal P49(1) to the AUX8 terminal P49(8) are non-safety output terminals configured to individually output, to the non-safety controller 240, the AUX outputs (AUX1 to AUX8) respectively corresponding to the maximum of eight safety switches 210 connected to the ports A and B. The AUX1 terminal P49(1) to the AUX8 terminal P49(8) are provided at a tip of a cable extending from the housing of the wiring unit 250. That is, an information output unit configured to individually output the states of the safety switches 210 is the cable. Note that each of the power input unit configured to input the power to the wiring unit 250, the safety output unit configured to perform the through-output of the OSSD outputs of the port A and the port B, the lock instruction input unit configured to receive the lock instructions, and the information output unit for individually outputting the states of the safety switches 210 is the cable in the present embodiment, but may be configured using a terminal block including corresponding terminals.

Further, the wire saving unit 250 includes, as functional blocks thereof, an MCU 250a, a lock input unit 250b, a voltage regulator 250c, an OSSD monitor unit 250d, an AUX output unit 250e, and a light emitting diode [LED] 250f.

The MCU 250a (=corresponding to the wiring unit MCU) individually grasps the respective states of the maximum of safety switches 210 cascade-connected to the ports A and B based on the downstream-facing communication data (=bundle data of the AUX outputs in the ports A and B) received via the COM_A terminal P45 and the COM_B terminal P46, respectively.

Then, the MCU 250a performs external output control and display output control (=switch state display control) according to the respective states of the safety switches 210 by controlling each of the AUX output unit 250e and the LED 250f. Note that the MCU 250a also has a function of performing display output control (=OSSD display control) in response to an OSSD output monitoring result from the OSSD monitor unit 250d.

Further, the MCU 250a outputs the upstream-facing communication data (=lock inputs of the ports A and B) from the COM_A terminal P45 and the COM_B terminal P46 based on the lock instructions received from the LOCK_A terminal P47 and the LOCK_B terminal P48 via the lock input unit 250b.

Note that the above-described signal input/output processing (and display processing) may be programmed in advance in the MCU 250a.

The lock input unit 250b receives the lock instructions of the ports A and B from the safety controller 230 via the LOCK_A terminal P47 and the LOCK_B terminal P48, and sends these lock instructions to the MCU 250a.

The voltage regulator 250c receives supply of the input voltage VCC (for example, DC+24 V) and the ground voltage GND (for example, 0 V) from the power unit 220 via the VCC terminal P31 and the GND terminal P34, and supplies power to each unit of the wire saving unit 250. For example, a DC-DC converter is used as the voltage regulator 250c.

The OSSD monitor unit 250d corresponds to a safety signal monitor unit that monitors the OSSD output transmitted inside the wire saving unit 250 and outputs the monitoring result to the MCU 250a. For example, the OSSD monitor unit 250d may monitor one OSSD output (OSSD1) of the duplexed OSSD outputs (OSSD1 and OSSD2).

With reference to this drawing, the OSSD monitor unit 250d takes out and monitors the OSSD output (OSSD1_A) of the port A from a safety output line laid between the OSSD1_I_A terminal P37 and the OSSD1_O_A terminal P39, and takes out and monitors the OSSD output (OSSD1B) of the port B from a safety output line laid between the OSSD1_I_B terminal P41 and the OSSD1_O_B terminal P43.

Note that the OSSD monitor unit 250d may include: a transmission unit that transmits a monitoring signal based on the OSSD outputs (OSSD1_A and OSSD1B) to be monitored; and a reception unit that receives the monitoring signal through isolated communication with the transmission unit and outputs the monitoring signal to the MCU 250*a*.

For example, the transmission unit may transmit a non-electrical monitoring signal (for example, an optical signal) based on the OSSD outputs (OSSD1_A and OSSD1B) to be monitored. In this case, a photocoupler including a light emitting element (such as a light emitting diode) and a light receiving element (such as a phototransistor) can be suitably used as the transmission unit and the reception unit.

Of course, a scheme of the isolated communication inside the OSSD monitor unit 250*d* (=between the transmission unit and the reception unit described above) is not limited to any optical isolation scheme, and a transformer isolation scheme, a capacitive isolation scheme, or the like may be adopted.

As described above, in a safety system including a plurality of safety devices, a safety parameter of the entire safety system is evaluated based on failure rates of the respective safety devices constituting the safety system. Therefore, it is preferable that as few constituent elements as possible can affect the OSSD output.

In view of this, the MCU 250*a* is desirably isolated from the safety output line through which the OSSD output is transmitted. According to this configuration, the OSSD output itself can pass over the wire saving unit 250 through the dedicated safety output line, and the MCU 250*d* can monitor the OSSD output while ensuring the independence of the OSSD output.

Note that a best mode in which the OSSD output is affected by nothing is not to provide the OSSD monitor unit 250*d*. However, existing safety switches also include a safety switch not having a function of outputting a safety state (≈door open or closed state) as communication data, and it is also possible to assume a case where such a safety switch is connected to the wire saving unit 250. Therefore, it is necessary to provide the OSSD monitor unit 250*d* in the wire saving unit 250 in order to grasp at least safety states for each port and perform display output and the like.

The AUX output unit 250*e* individually outputs the AUX outputs (AUX1 to AUX8) of the respective safety switches 210 to the non-safety controller 240 in response to an instruction from the MCU 250*d*.

The LED 250*f* performs OSSD display and switch state display in response to an instruction from the MCU 250*d*. Note that the LED 250*f* can be understood as, for example, the OSSD indicator lamps 252A and 252B and the switch state indicator lamp 253 in FIG. 4.

<Safety Switch (Application Example)>

Figure 6:
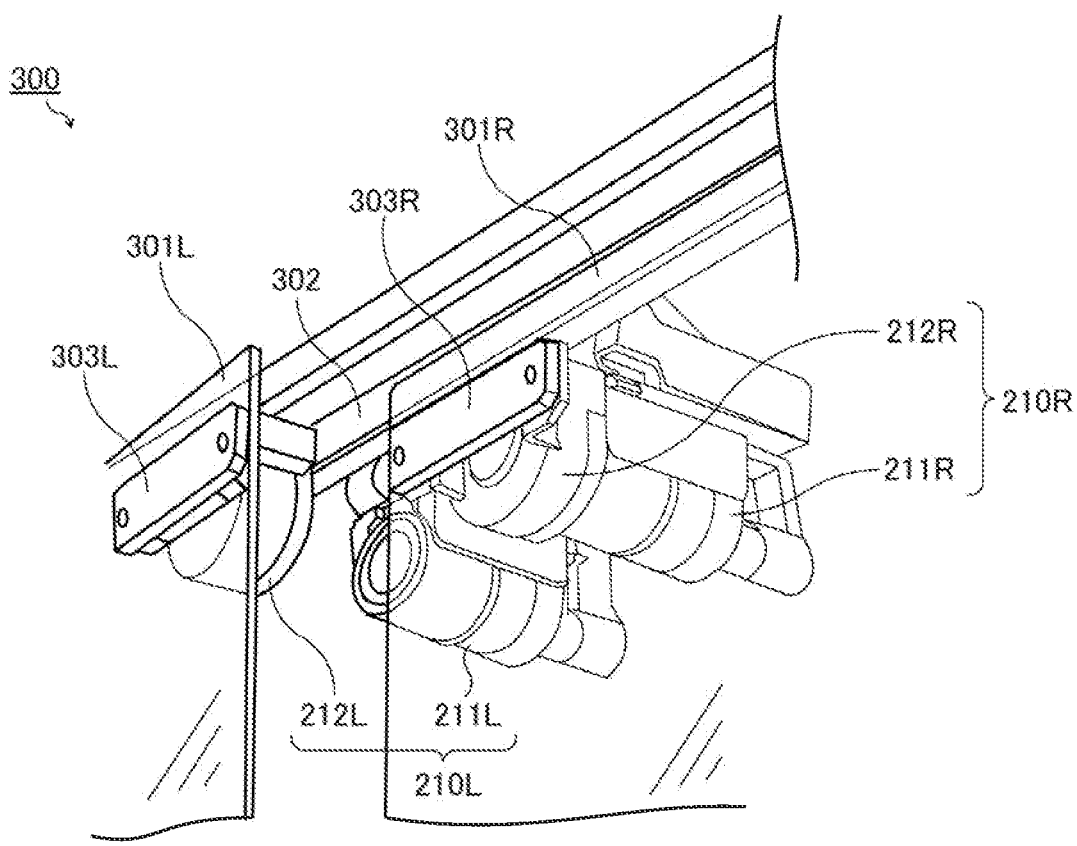
FIG. 6 is a view illustrating an application example of a safety switch.

FIG. 6 is a view illustrating an application example of the safety switch 210. This drawing illustrates a guard 300 surrounding a hazard source such as a machine tool. The guard 300 is an example of safety protection using isolation, and a part (particularly, around a door where with a safety switch) of a surrounding box including an isolation wall is depicted in this drawing. However, the depiction of this drawing is merely an example, and it can be understood by replacing the isolation wall of this drawing with an iron fence or the like.

The guard 300 includes double doors 301L and 301R as movable guards that can be opened and closed. Each of the doors 301L and 301R may be made of a transparent resin, reinforced glass, or the like. A safety switch 210L is provided at an upper right corner of the left door 301L. A safety switch 210R is provided at an upper left corner of the right door 301R. Each of the safety switches 210L and 210R can be understood to correspond to the safety switch 210 described above.

Note that alphabets L and R following reference numerals are used to distinguish between a plurality of the same or similar members. The alphabets L and R are omitted when matters common to the plurality of members are described.

Each of a switch body 211L of the safety switch 210L and a switch body 211R of the safety switch 210R is fixed to a door frame 302 of the guard 300. In this manner, the switch body 211 to which a cable is connected is desirably installed not on the door 301 that can be open and closed (moved) but on the fixed door frame 302.

On the other hand, an actuator 212L of the safety switch 210L is fixed to a support member 303L fixed to the door 301L. Further, an actuator 212R of the safety switch 210R is fixed to a support member 303R fixed to the door 301R.

Note that, as a safety function contributing to a safety system, the safety switch 210 detects whether or not the actuator 212 is within a predetermined range with respect to the switch body 211, and outputs a detection result as a safety signal (OSSD).

For example, when the door 301 of the guard 300 is closed, an RFID of the actuator 212 provided in the door 301 approaches a detection unit (antenna coil) of the switch body 211 provided in the door frame 302. At this time, the switch body 211 detects that the actuator 212 is within the predetermined range with respect to the switch body 211, that is, that the door 301 is closed since the RFID is identified by the detection unit.

On the other hand, when the door 301 of the guard 300 is open, the RFID of the actuator 211 provided in the door 301 is spaced apart from the detection unit (antenna coil) of the switch body 211 provided in the door frame 302. At this time, the switch body 211 detects that the actuator 212 is not within the predetermined range with respect to the switch body 211, that is, the door 301 is open since the communication between the detection unit and the RFID is not established.

In this manner, the safety switches 210 are arranged so as to detect the open or closed states of the respective corresponding doors 301.

When at least one of the doors 301L and 301R (the door 301L in this drawing) is open, a state is formed in which the operation of the machine tool surrounded by the guard 300 is prohibited. On the other hand, when both the doors 301L and 301R are closed, a state is formed in which the operation of the machine tool surrounded by the guard 300 can be permitted (=a state satisfying one of operation permission conditions) is formed.

In this manner, the safety switch 210 is a device configured as a protective measure against a moving device (mechanical hazard source). In particular, the safety switch 210 is a type of safety protection by stopping. In this type, an operation region where the hazard source operates is defined, and the operation of the hazard source is stopped when detecting that a human body is likely to enter such a movable region or the entry of the human body. In particular, in the safety system provided with the safety switch 210, the hazard source is stopped when a state where the door 301 is closed transitions to a state where the door 301 is open.

That is, in a "safe state", which is achieved while a state in which various conditions including the absence of an entry of a human body in the operation region and the like are satisfied is being maintained by closing of the door 301, the safety switch 210 outputs an ON signal, and the hazard source operates. On the other hand, when the door 301 is moved from the "safe state" so that the operation region is opened, the safety switch 210 outputs an OFF signal, and the hazard source stops.

In the entire safety system, once the OFF signal is output from the safety switch 210, the hazard source is not restarted even if the door 301 itself moves to a closed position, but is restarted when a reset signal is separately input. This is because, once the door 301 is opened, it is difficult to confirm the absence of an entry of a human body in the operation region even if the door 301 is closed thereafter.

Further, the safety switch 210 has a lock portion for restricting opening of the door 301 in addition to the safety function.

For example, the safety switch 210 drives an electromagnet of the switch body 211 when receiving a lock input output from an external device (for example, the safety controller 230 described above) in the state of detecting that the actuator 212 is within the predetermined range with respect to the switch body 211 (=that the door 301 is closed). At this time, an iron plate of the actuator 212 is magnetized. As a result, the opening of the door 301 is restricted by an attractive force between the electromagnet and the iron plate. Note that the safety switch 210 may be configured not to unlock the door 301 unless a specific signal is input from the external device. Further, as a mechanism of the lock portion, engagement between a bolt and a pin may be used instead of the attraction between the electromagnet and the iron plate.

With the safety switch 210 having a lock function, it is possible to prevent, in advance, trouble that the machine tool or the like (mechanical hazard source) stops based on the OSSD output every time a user opens the door 301 by mistake.

In this manner, the above-described lock function can be understood as an auxiliary function (=non-safety function) for maintaining smooth operation of the machine tool or the like. That is, the safety function of the safety system is realized only through the OSSD output of the safety switch 210.

<Safety Switch (Functional Block)>

Figure 7:
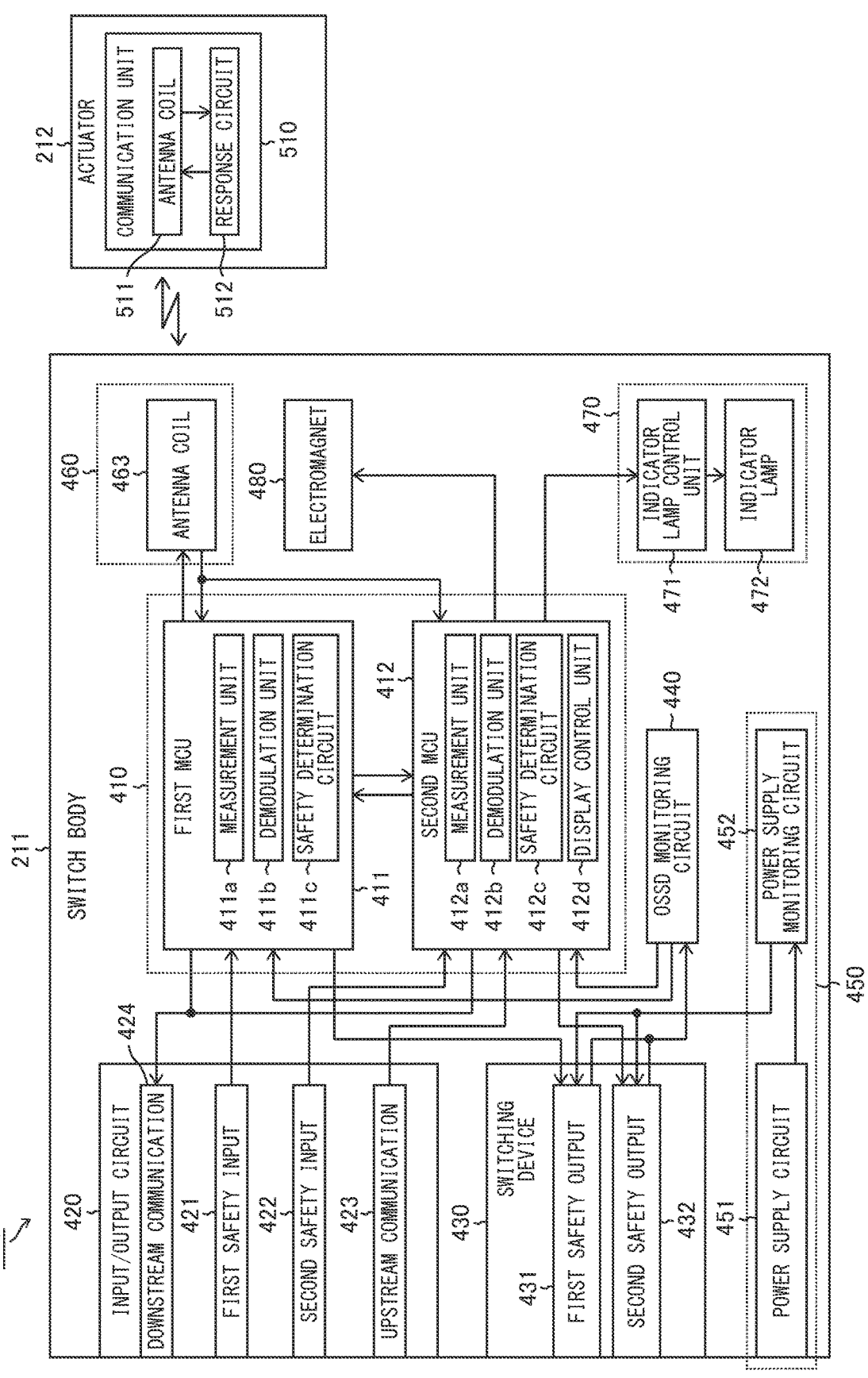
FIG. 7 is a diagram illustrating a functional block of the safety switch.

FIG. 7 is a diagram illustrating a functional block of the safety switch 210. In the safety switch 210 of the present configuration example, the switch body 211 includes a control circuit 410, an input/output circuit 420, a switching device 430, an OSSD monitoring circuit 440, a power supply unit 450, a communication unit 460, a display unit 470, and an electromagnet 480. In this drawing, constituent elements (mainly constituent elements related to terminals) of a hinge type provided on the rearward side (back side) of the switch body 211 are collectively depicted on the left side of the block. Further, constituent elements of a hinge type provided on the forward side (front side) of the switch body 211 are collectively depicted on the right side of the block.

The control circuit 410 (corresponding to a safety switch MCU) includes a first MCU 411 and a second MCU 412. The input/output circuit 420 includes a first safety input unit 421, a second safety input unit 422, an upstream communication unit 423, and a downstream communication unit 424. The switching device 430 includes a first safety output unit 431 and a second safety output unit 432. The power supply unit 450 includes a power supply circuit 451 and a power supply monitoring circuit 452. The communication unit 460 includes an antenna coil 463. The display unit 470 includes an indicator lamp control unit 471 and an indicator lamp 472.

Further, the actuator 212 includes a communication unit 510 in the safety switch 210 of the present configuration example. Note that the communication unit 510 includes an antenna coil 511 and a response circuit 512.

The first MCU 411 and the second MCU 412 communicate with each other to monitor each other. The first MCU 411 and the second MCU 412 are connected to the antenna coil 463.

The first MCU 411 drives the antenna coil 463, and transmits a wireless signal from the antenna coil 463 to the communication unit 510 (in particular, the antenna coil 511) of the actuator 212. The communication unit 510 may be a wireless tag (RF-ID tag).

The response circuit 512 operates using an induced current generated in the antenna coil 511 as a power source. Further, the response circuit 512 demodulates the wireless signal received by the antenna coil 511 to acquire information, and further transmits the wireless signal (response signal) via the antenna coil 511.

Each of the first MCU 411 and the second MCU 412 receives the wireless signal (response signal) transmitted from the antenna coil 511 of the actuator 212 via the antenna coil 463.

The first MCU 411 includes a measurement unit 411a, a demodulation unit 411b, and a safety determination circuit 411c. Further, the second MCU 412 includes a measurement unit 412a, a demodulation unit 412b, a safety determination circuit 412c, and a display control unit 412d.

Each of the measurement units 411a and 412a measures the intensity of the wireless signal (response signal) received via the antenna coil 463, and estimates an inter-coil distance d (and further, a distance from the switch body 211 to the actuator 212) between the antenna coil 463 of the switch body 211 and the antenna coil 511 of the actuator 212 based on a result of the measurement. Note that the antenna coil 463 functions as the detection unit that detects that the actuator 212 is within the predetermined range with respect to the switch body 211. Further, instead of the inter-coil distance d, the intensity of the wireless signal may be directly used to sense a position of the actuator 212.

Further, the detection unit detecting that the actuator 212 is within the predetermined range with respect to the switch body 211 is not limited to the above-described technique using the antenna coil 463. For example, a detection unit based on a detection principle in which a physical switch is provided in the switch body 211, and the physical switch is pressed by a protruding member or the like provided in the actuator 212 when a door is closed and the actuator 212 approaches the switch body 211 may be adopted.

Each of the demodulation units 411b and 412b demodulates information conveyed by the wireless signal (response signal) received via the antenna coil 463, and identifies the actuator 212 based on the information. Note that this information may include unique identification information (ID information).

The safety determination circuit 411c of the first MCU 411 determines whether the inter-coil distance d measured by the measurement unit 411a is equal to or less than a threshold dth, and transmits a result of the determination to the second MCU 412. Similarly, the safety determination circuit 412c of the second MCU 412 determines whether the inter-coil distance d measured by the measurement unit 412a is equal to or less than the threshold dth, and transmits a result of the determination to the first MCU 411. Then, each of the safety determination circuits 411c and 412c determines that the actuator 212 is in a state (door closed state) of being within the predetermined range with respect to the switch body 211 when the determination result of the own unit coincides with the determination result of the counterpart (when both the units determine that the inter-coil distance d is equal to or less than the threshold dth).

In the input/output circuit 420, the first safety input unit 421 and the second safety input unit 422 are input circuits configured for a serial cascade connection of the plurality of safety switches 210. For example, the first safety input unit 421 and the second safety input unit 422 are connected to the first safety output unit 431 and the second safety output unit 432, respectively, of another safety switch 210 provided on the upstream side.

The first MCU 411 is connected to the first safety input unit 421. When the ON signal is input through the first safety input unit 421, the first MCU 411 controls the first safety output unit 431 based on a proximity state of the actuator 212 (=the open or closed state of the door) and a locked state of the electromagnet 480. On the other hand, when the OFF signal is input through the first safety input unit 421, the first MCU 411 causes the first safety output unit 431 to output the OFF signal without depending on the proximity state of the actuator 212 and the locked state of the electromagnet 480.

Similarly, the second MCU 412 is connected to the second safety input unit 422. When the ON signal is input through the second safety input unit 422, the second MCU 412 controls the second safety output unit 432 based on the proximity state of the actuator 212 and the locked state of the electromagnet 480. On the other hand, when the OFF signal is input through the second safety input unit 422, the second MCU 412 causes the second safety output unit 432 to output the OFF signal without depending on the proximity state of the actuator 212 and the locked state of the electromagnet 480.

As a result, the plurality of safety switches 210 can be connected in a cascade. When any one of the plurality of safety switches 210 is not in the safe state, the OFF signal is output to the external device (for example, the safety controller 230). Therefore, for example, in a case where a plurality of doors are provided for an iron fence surrounding a hazard source, the operation of the hazard source is not possible unless all the doors are in the safe state. On the other hand, when all of the plurality of safety switches 210 are in the safe state, the ON signal is output to the external device.

The upstream communication unit 423 is connected to another safety switch 210 provided on the upstream side, and transmits upstream-facing communication data (including the lock input) and receives downstream-facing communication data (including bundle data of AUX outputs).

The downstream communication unit 424 is connected to another safety switch 210 or the wire saving unit 250 provided on the downstream side, and transmits downstream-facing communication data (including bundle data of AUX outputs) and receives upstream-facing communication data (including the lock input).

For example, the control circuit 410 generates downstream-facing communication data based on communication data (=communication data obtained by bundling upstream AUX outputs) received via the upstream communication unit 423 and the own state of the safety switch 210, and outputs the downstream-facing communication data from the downstream communication unit 424.

The first safety output unit 431 and the second safety output unit 432 respectively output OSSD outputs (OSSD1_O and OSSD2_O) to another safety switch 210 or the wire saving unit 250 provided on the downstream side.

For example, the control circuit 410 outputs the OSSD outputs (OSSD1_O and OSSD2_O) from the first safety output unit 431 and the second safety output unit 432, respectively, based on OSSD inputs (OSSD1_I and OSSD2_I) received via the first safety input unit 421 and the second safety input unit 422, respectively, and a proximity state of the actuator 212 (=a detection result obtained by the detection unit).

In the switching device 430, the first safety output unit 431 and the second safety output unit 432 can be configured as, for example, an open collector output circuit using a PNP transistor. In this case, when the PNP transistor is turned on, a positive-side power supply is connected to an output terminal, so that the ON signal (=high level) is output. On the other hand, when the PNP transistor is turned off, the output terminal is grounded via a pull-down resistor, so that the OFF signal (=low level) is output.

Note that each of the first safety output unit 431 and the second safety output unit 432 can also be configured as an open collector output circuit using an NPN transistor. In this case, output logic levels are reversed from the above. Specifically, the ON signal becomes a low level, and the OFF signal becomes a high level.

The OSSD monitoring circuit 440 may be connected to each of the first safety output unit 431 and the second safety output unit 432. The OSSD monitoring circuit 440 is connected to the first MCU 411 and the second MCU 412. The first MCU 411 monitors whether the operation of the second safety output unit 432 is normal through the OSSD monitoring circuit 440. The second MCU 412 monitors whether the operation of the first safety output unit 431 is normal through the OSSD monitoring circuit 440.

For example, each of the first safety output unit 431 and the second safety output unit 432 periodically shifts the output signal to OFF for a minute time when outputting the ON signal. The OSSD monitoring circuit 440 determines that the OSSD is normal if the OFF for the minute time can be detected during an output period of the ON signal, and determines that the OSSD is not normal if the OFF for the minute time cannot be detected. When it is determined that the OSSD is not normal, the OSSD outputs of the first safety output unit 431 and the second safety output unit 432 transition to OFF. In this manner, the OSSD monitoring circuit 440 senses a failure occurring in the switch body, and a sensing result of the failure is reflected in the OSSD outputs of the first safety output unit 431 and the second safety output unit 432.

Note that a case where the ON signal continues is caused by a short circuit between the output terminal and the positive-side power supply. In this case, the safety determination circuits 411c and 412c output control signals for outputting the OFF signal to the first safety output unit 431 and the second safety output unit 432, respectively. As a result, the normal one of the first safety output unit 431 and the second safety output unit 432 outputs the OFF signal.

The external device (for example, the safety controller 230) is in a state of being capable of permitting the operation of the hazard source only during a period in which both the first safety output unit 431 and the second safety output unit 432 output the ON signals. In other words, the external device does not permit the operation of the hazard source during a period in which at least one of the first safety output unit 431 and the second safety output unit 432 outputs the OFF signal. Note that the external device is configured not to react to the OFF for the minute time during the ON signal described above.

In the power supply unit 450, the power supply circuit 451 is a DC-DC converter that receives supply of an input voltage VCC (for example, DC+24 V) and a ground voltage GND (for example, 0 V) from the outside and generates a desired output voltage VREG (for example, DC+10 V, +5 V, or +3.3 V). Note that the power supply circuit 451 supplies power to each unit (=all circuits that require power) of the switch body 211.

Meanwhile, when the input voltage VCC or the output voltage VREG is not within a predetermined range, there is a possibility that the first MCU 411, the second MCU 412, and the like do not normally operate. Therefore, the power supply monitoring circuit 452 determines whether the input voltage VCC and the output voltage VREG are within the predetermined range, and outputs a determination result to the first safety output unit 431 and the second safety output unit 432.

When receiving the determination result indicating that the power supply circuit 451 is not normally operating, each of the first safety output unit 431 and the second safety output unit 432 outputs the OFF signal without depending on the control signal output from each of the first MCU 411 and the second MCU 412.

On the other hand, when receiving the determination result indicating that the power supply circuit 451 is normally operating, each of the first safety output unit 431 and the second safety output unit 432 outputs the ON signal or the OFF signal depending on the control signal output from each of the first MCU 411 and the second MCU 412. In this manner, the power supply monitoring circuit 452 senses a failure related to a power supply of the switch body 211, and a sensing result of the failure is reflected in the OSSD outputs of the first safety output unit 431 and the second safety output unit 432.

Based on an instruction from the control circuit 410 (for example, the display control unit 412d of the second MCU 412), the indicator lamp control unit 471 turns on or off or causes blinking in green or blinking in red of the indicator lamp 472 (for example, a large indicator lamp) according to the proximity state of the actuator 212 (=the open or closed state of the door) and the locked or unlocked state of the electromagnet 480.

Further, the indicator lamp control unit 471 turns on or off or causes blinking in green or blinking in red of the indicator lamp 472 (for example, a plurality of small indicator lamps) according to the OSSD output, an INPUT signal, the locked state or unlocked state, and the like. Note that the above OSSD output is an output signal of each of first safety output unit 431 and second safety output unit 432.

The electromagnet 480 generates a magnetic force by a drive current supplied from the control circuit 410 (for example, the second MCU 412). At this time, the iron plate (not illustrated) of the actuator 212 close to the switch body 211 is magnetized. As a result, the door is locked by an attractive force between the electromagnet 480 and the iron plate.

<Terminal Function Switching>

Incidentally, the safety switch 210 may include a first operation mode in which the lock input and the AUX output are input or output in parallel as in the above-described conventional example (FIG. 10), and a second operation mode in which the lock input and the AUX output are serially input or output via a communication line of one system as in the above-described first embodiment (FIG. 1) and second embodiment (FIG. 2).

As tools for realizing the first and second operation modes described above, for example, the safety switch 210 is provided with a first terminal switchable as a lock input terminal or a downstream communication terminal, and a second terminal switchable as an AUX output terminal or an upstream communication terminal.

Further, for example, the safety switch 210 (particularly, the control circuit 410) may switch the first terminal and the second terminal from the first operation mode of being used as the lock input terminal and the AUX output terminal, respectively, to the second operation mode of being used as the downstream communication terminal and the upstream communication terminal, respectively, based on a switching signal input to the first terminal.

Note that the wire saving unit 250 (in particular, the MCU 250a) may transmit the switching signal indicating a specific pattern instead of the lock input as the upstream-facing communication data when activated, for example.

The safety switch 210 of the present configuration example can be developed in the market as a dual-purpose model compatible with both cascade connection and non-cascade connection.

<Signal Processing>

Figure 8:
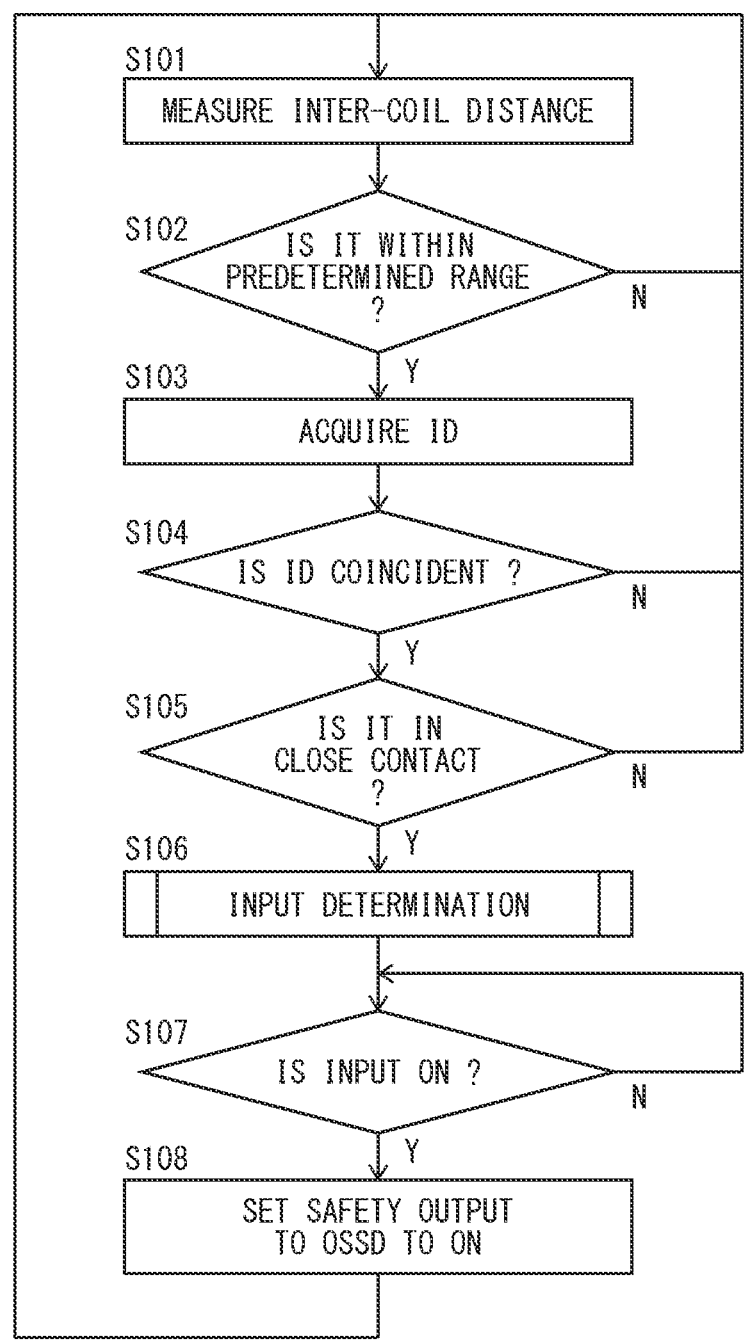
FIG. 8 is a view illustrating an example of signal processing in the safety switch.

FIG. 8 is a view illustrating an example of signal processing in the safety switch 210. Note that Steps S101 to S108 in this drawing can be basically understood as software processing executed by the control circuit 410 of the switch body 211.

In Step S101, the inter-coil distance d between the antenna coil 463 of the switch body 211 and the antenna coil 511 of the actuator 212 is measured.

In Step S102, it is determined whether or not the inter-coil distance d measured in Step S101 is within a predetermined range (the threshold dth or less). Here, in a case where it is determined as YES, the flow proceeds to Step S103. On the other hand, in a case where it is determined as NO, the flow returns to Step S101 described above. Further, in a case where it is determined as NO in Step S102, the display unit 470 may be lit in red.

In Step S103, a wireless signal (response signal) from the actuator 212 is demodulated, and identification information (ID) of the actuator 212 is acquired.

In Step S104, it is determined whether or not the ID acquired in Step S103 coincides with an expected value. Here, in a case where it is determined as YES, the flow proceeds to Step S105. On the other hand, in a case where it is determined as NO, the flow returns to Step S101 described above. Further, in a case where it is determined as NO in Step S104, the display unit 470 may be lit in red.

In Step S105, it is determined whether or not the electromagnet 480 of the switch body 211 and the iron plate of the actuator 212 are in close contact with each other. Here, in a case where it is determined as YES, the flow proceeds to Step S106. On the other hand, in a case where it is determined as NO, the flow returns to Step S101 described above.

Figure 9:
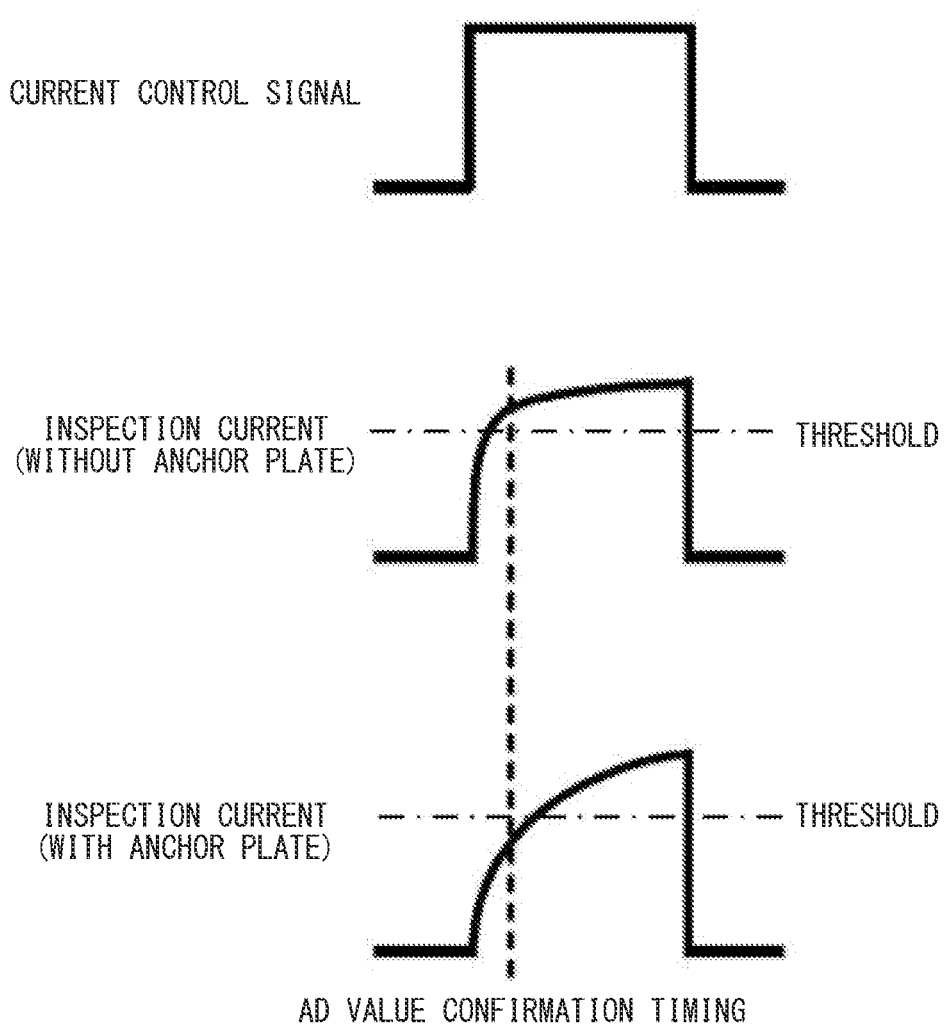
FIG. 9 is a view illustrating an example of a close contact determination process.

FIG. 9 is a view illustrating an example of a close contact determination process in Step S105, and a current control signal of the electromagnet 480 and inspection currents (without anchor plate/with anchor plate) flowing through the electromagnet 480 are depicted in order from the top.

During an ON period of the current control signal (a high-level period in this drawing), the inspection current flows through the electromagnet 480. Note that a current value of the inspection current is lower than a current value of a drive current flowing at the time of locking and attraction. If an inspection current at the same level as the drive current for locking and attraction is applied, the door is difficult to open even though no lock input is given, which affects usability. Therefore, it is desirable to perform the close contact determination by flowing a minute inspection current so as not to generate an attractive force.

In the close contact determination process in Step S105, the current value of the inspection current flowing through the electromagnet 480 is monitored. When the iron plate (anchor plate) is in close contact with the electromagnet 480, an inductance of the electromagnet 480 increases. Therefore, a response time of the inspection current (=time until the inspection current reaches a constant value from when the current control signal is set to ON) increases.

Therefore, whether the current value (AD value) of the inspection current exceeds a threshold is determined at an AD value confirmation timing after a lapse of a certain period of time from when the current control signal is set to ON.

For example, when the current value of the inspection current exceeds the threshold at the AD value confirmation timing, it can be said that the inductance of the electromagnet 480 is low and the response time is short. Therefore, it is determined that the iron plate is not in close contact. On the other hand, when the current value of the inspection current does not exceed the threshold at the AD value confirmation timing, it can be said that the inductance of the electromagnet 480 is high and the response time is long. Therefore, it is determined that the iron plate is in close contact.

In this manner, in Step S105, the close contact with the iron plate is determined based on a change in the inductance of the electromagnet 480. Note that the electromagnet 480 is not driven even if the lock input is received before it is determined as YES in Step S105. On the other hand, the electromagnet 480 is driven in response to the lock input if it is determined as YES in Step S105.

When the electromagnet 480 is driven in a state in which the electromagnet 480 and the iron plate are not in close contact with each other, a foreign matter as a magnetic body is attracted. Therefore, it is desirable to include in a driving condition of the electromagnet 480 that the electromagnet 480 and the iron plate are in a close contact state.

Returning to FIG. 8, the description of the flow will be continued. In Step S106, various input determination processes are performed. With reference to this drawing, in Step S106, whether or not the lock input from a control apparatus (such as the safety controller 230) that controls the safety switch 210 is set to ON is determined as a first input determination. The first input determination is omitted in a safety switch (for example, the safety switch 210(A4) in FIG. 2 described above) not having a lock function.

Further, in Step S106, as a second input determination, it is determined whether or not all the OSSD inputs from another safety switch 210 connected in a cascade on the upstream side are set to ON.

Note that it is sufficient to perform the above-described second input determination only when the plurality of safety switches 210 are connected in a cascade. Note that it is sufficient to perform a determination on the presence or absence of the cascade connection independently of the software processing of the control circuit 410 illustrated in the flow from Steps S101 to S108. For example, the determination on the presence or absence of the cascade connection may be performed at determination processing timings (for example, Steps S102, S104, and S105) included in Steps S101 to S108 or at predetermined time intervals.

Further, display control according to a result of the input determination of Step S106 may be performed in the display unit 470. As an example of the display control, the display unit 470 may be lit in orange in a case where the lock input is ON and the safety input is OFF. On the other hand, the display unit 470 may blink in green in a case where the lock input is OFF and the safety input is ON. Further, the display unit 470 may blink in orange in a case where both the lock input and the safety input are OFF.

In Step S107, it is determined whether both the first and second input determinations in Step S106 are ON, in other words, whether both the lock input and the OSSD input are ON. Here, in a case where it is determined as YES, the flow proceeds to Step S108. On the other hand, in a case where it is determined as NO, the flow returns to Step S107 and the above determination process is continued.

In Step S108, the ON signal is output via the first safety output unit 431 and the second safety output unit 432. That is, the OSSD output is set to ON. Such a safety output is used for the input determination process in another safety switch 210 connected in a cascade on the downstream side. Further, the display unit 470 may be lit in green to indicate that the OSSD output is set to ON.

Thereafter, the flow returns to Step S101 described above in order to determine whether or not to maintain the ON state of the safety output. Note that the safety output is affected by the determinations in Step S101 and Step S106 in the present embodiment Therefore, Step S105 may be omitted in the determination flow as to whether or not to maintain the ON state of the safety output.

<Conclusion>

Hereinafter, various embodiments described above will be comprehensively described.

For example, according to one configuration (first configuration), a wiring unit disclosed in the present specification is connected to a plurality of safety switches each including an actuator and a switch body that detects the actuator in a cascade connection. The wiring unit includes: a power input unit configured to receive power; a safety switch port that includes a pair of safety input terminals receiving a first safety signal, which is a pair of safety signals output by a first safety switch among the plurality of safety switches connected in a cascade, a pair of power output terminals configured to supply power received via the power input unit to the plurality of safety switches, and a wiring unit communication terminal configured to perform bidirectional communication with the first safety switch; a safety output unit internally connected to the pair of safety input terminals to through-output the first safety signal received via the pair of safety input terminals; a lock instruction input unit that receives a lock instruction for locking a safety switch capable of locking movement of the actuator with respect to the switch body in response to an instruction among the plurality of safety switches; an information output unit configured to individually output information indicating a state of each of the plurality of safety switches; and a wiring unit MCU that individually outputs information indicating a state of each of the plurality of safety switches based on information from the plurality of safety switches received via the wiring unit communication terminal, and outputs a lock input for instructing locking based on the lock instruction received via the lock instruction input unit to the safety switch capable of the locking. The safety output unit is internally connected to the pair of safety input terminals to enable failure sensing by a failure sensing function of the first safety switch.

Note that, the wiring unit according to the first configuration may have a configuration (second configuration) in which the wiring unit MCU is isolated from a safety output line including the safety input terminals and the safety output unit.

Further, the wiring unit according to the second configuration may have a configuration (third configuration) in which a safety signal monitor unit that monitors the first safety signal sent to the safety output line and outputs a monitoring result to the wiring unit MCU is provided, and the safety signal monitor unit includes a transmission unit that transmits a monitoring signal based on the first safety signal sent to the safety output line, and a reception unit that receives the monitoring signal by isolated communication with the transmission unit and outputs the monitoring signal to the wiring unit MCU.

Further, the wiring unit according to the third configuration may have a configuration (fourth configuration) in which the transmission unit transmits the monitoring signal, which is not electrical, based on the first safety signal sent to the safety output line.

Further, the wiring unit according to the first configuration may have a configuration (fifth configuration) in which a housing that accommodates the wiring unit MCU is provided, and the safety switch port is configured using a connector provided on the housing.

Further, the wiring unit according to the first configuration may have a configuration (sixth configuration) in which a housing that accommodates the wiring unit MCU and a cable extending to the outside of the housing are provided, and the safety switch port is configured using a connector provided in the cable.

Further, the wiring unit according to the first configuration may have a configuration (seventh configuration) in which a housing that accommodates the wiring unit MCU is provided, and the housing is provided with: a first safety switch port and a second safety switch port which serve as the safety switch port; and a first lock instruction input unit and a second lock instruction input unit which serve as the lock instruction input unit, the first lock instruction input unit being configured to receive a lock instruction for instructing the lockable safety switch connected via the first safety switch port to perform locking, and the second lock instruction input unit being configured to receive a lock instruction for instructing the lockable safety switch connected via the second safety switch port to perform locking.

Further, the wiring unit according to the first configuration may have a configuration (eighth configuration) in which, when a plurality of the lockable safety switches are connected as the plurality of safety switches, the wiring unit MCU supplies a same lock input to each of the plurality of lockable safety switches.

Further, the wiring unit according to the first configuration may have a configuration (ninth configuration) provided with: a housing that accommodates the wiring unit MCU; and an indicator lamp that is provided on the housing and individually displays a state of each of the plurality of safety switches based on information received from the plurality of safety switches via the wiring unit communication terminal.

Further, the wiring unit according to the first configuration may have a configuration (tenth configuration) provided with: a housing that accommodates the wiring unit MCU; and an OSSD indicator lamp that is provided on the housing and displays a state of the first safety signal received by the safety input terminals included in the safety switch port.

Further, the wiring unit according to the first configuration may have a configuration (eleventh configuration) provided with: a housing that accommodates the wiring unit MCU; and a cable as the safety output unit extending to the outside of the housing.

Further, the wiring unit according to the first configuration may have a configuration (twelfth configuration) provided with: a housing that accommodates the wiring unit MCU; and a cable as the lock instruction input unit extending to the outside of the housing.

Further, the wiring unit according to the first configuration may have a configuration (thirteenth configuration) provided with: a housing that accommodates the wiring unit MCU; and a cable as the information output unit extending to the outside of the housing.

Further, the wiring unit according to the first configuration may have a configuration (fourteenth configuration) provided with: a housing that accommodates the wiring unit MCU; and a cable as the power input unit extending to the outside of the housing.

Further, the wiring unit according to the first configuration may have a configuration (fifteenth configuration) in which at least one of the safety output unit, the lock instruction input unit, the information output unit, and the power input unit is configured using a terminal block.

Further, for example, according to a sixteenth configuration, a serial cascade connector system disclosed in the present specification includes: a first safety switch and a second safety switch as safety switches each including an actuator and a switch body that detects the actuator; and a wiring unit to which the first safety switch and the second safety switch are connected in a cascade connection. At least one of the first safety switch and the second safety switch is a lockable safety switch including a lock portion capable of locking movement of the actuator in response to a lock input. The first safety switch includes: a pair of first safety input terminals configured to receive a second safety signal that is a pair of safety signals output from the second safety switch; a pair of first safety output terminals configured to output a first safety signal, which is a pair of safety signals, to the wiring unit; a first terminal configured to perform bidirectional communication with the second safety switch; a second terminal configured to perform bidirectional communication with the wiring unit; a detection unit detecting that the actuator is within a predetermined range with respect to the switch body; a safety switch MCU that outputs the first safety signal based on the second safety signal received via the first safety input terminals and a detection result obtained by the detection unit, and outputs, via the second terminal, information indicating states of the first safety switch and the second safety switch based on information indicating the state of the second safety switch received via the first terminal; and a failure sensing unit that senses a failure of the first safety switch. The wiring unit includes: a safety switch port that includes a pair of safety input terminals receiving the first safety signal, a power input unit configured to receive power, a pair of power output terminals configured to supply the power received via the power input unit to the first safety switch and the second safety switch, and a wiring unit communication terminal configured to perform bidirectional communication with the first safety switch; a safety output unit that is internally connected to the pair of safety input terminals to perform through-output of the first safety signal received via the safety input terminals; a lock instruction input unit that receives a lock instruction for locking the lockable safety switch; an information output unit configured to individually output the information indicating the state of each of the plurality of safety switches; and a wiring unit MCU that individually outputs the information indicating the state of the first safety switch and the information indicating the state of the second safety switch based on information received via the wiring unit communication terminal, and outputs the lock input for instructing locking based on the lock instruction received via the lock instruction input unit to the lockable safety switch via the wiring unit communication terminal. The safety output unit being internally connected to the pair of safety input terminals to enable sensing of a failure by a failure sensing unit included in the first safety switch at a destination where the first safety signal received from the through-output performed by the safety output unit.

Note that the serial cascade connector system according to the sixteenth configuration may have a configuration (seventeenth configuration) in which, when the wiring unit MCU receives the lock instruction via the lock instruction input unit, the lock input for driving the lock portion of the second safety switch as the lockable safety switch is input to the second safety switch at a timing different from a timing at which the lock portion is driven in the first safety switch as the lockable safety switch.

Further, the serial cascade connector system according to the sixteenth configuration may have a configuration (eighteenth configuration) in which the wiring unit MCU transmits a switching signal to the first safety switch via the wiring unit communication terminal when activated, and the first safety switch switches an operation mode for two terminals of the first terminal and the second terminal, based on the switching signal, from a first operation mode in which one of the first terminal and the second terminal is used as a lock input terminal that receives the lock input and another terminal is used as a state information output terminal that outputs the information indicating the state of the first safety switch to a second operation mode in which the first terminal is used as an upstream communication terminal for bidirectional communication with the second safety switch and the second terminal is used as a downstream communication terminal for bidirectional communication with the wiring unit.

OTHER MODIFICATIONS

Note that, in addition to the above-described embodiments, various alterations can be applied to various technical features disclosed in the present specification within a scope not departing from the spirit of the technical creation. That is, it is to be understood that the above-described embodiments are illustrative in all respects and not restrictive, and the technical scope of the invention is defined by the claims, and includes all alterations falling within the meaning and scope equivalent to the claims.

What is claimed is:

1. A wiring unit to which a plurality of safety switches each including an actuator and a switch body that detects the actuator are connected in a cascade connection, the wiring unit comprising:
   a power input unit configured to receive power;
   a safety switch port that includes a pair of safety input terminals receiving a first safety signal, which is a pair of safety signals output by a first safety switch among the plurality of safety switches cascade-connected, a pair of power output terminals configured to supply power received via the power input unit to the plurality of safety switches, and a wiring unit communication terminal configured to perform bidirectional communication with the first safety switch;
   a safety output unit internally connected to the pair of safety input terminals to perform through-output of the first safety signal received via the pair of safety input terminals;
   a lock instruction input unit that receives a lock instruction for locking a lockable safety switch capable of locking movement of the actuator with respect to the switch body in response to an instruction among the plurality of safety switches;
   an information output unit configured to individually output information indicating a state of each of the plurality of safety switches; and
   a wiring unit MCU that individually outputs information indicating a state of each of the plurality of safety switches based on information from the plurality of safety switches received via the wiring unit communication terminal, and outputs a lock input for instructing locking based on the lock instruction received via the lock instruction input unit to the lockable safety switch,
   wherein the safety output unit is internally connected to the pair of safety input terminals to enable failure sensing by a failure sensing function of the first safety switch.

2. The wiring unit according to claim 1, wherein the wiring unit MCU is isolated from a safety output line including the safety input terminals and the safety output unit.

3. The wiring unit according to claim 2, further comprising a safety signal monitor unit that monitors the first safety signal sent to the safety output line and outputs a monitoring result to the wiring unit MCU,
   wherein the safety signal monitor unit includes a transmission unit that transmits a monitoring signal based on the first safety signal sent to the safety output line, and a reception unit that receives the monitoring signal by isolated communication with the transmission unit and outputs the monitoring signal to the wiring unit MCU.

4. The wiring unit according to claim 3, wherein the transmission unit transmits the monitoring signal, which is not electrical, based on the first safety signal sent to the safety output line.

5. The wiring unit according to claim 1, further comprising a housing that accommodates the wiring unit MCU,
   wherein the safety switch port is configured using a connector provided in the housing.

6. The wiring unit according to claim 1, further comprising:
   a housing that accommodates the wiring unit MCU; and
   a cable extending to an outside of the housing,
   wherein the safety switch port is configured using a connector provided in the cable.

7. The wiring unit according to claim 1, further comprising a housing that accommodates the wiring unit MCU,
   wherein the housing is provided with:
   a first safety switch port and a second safety switch port which serve as the safety switch port; and
   a first lock instruction input unit and a second lock instruction input unit which serve as the lock instruction input unit, the first lock instruction input unit being configured to receive a lock instruction for instructing the lockable safety switch connected via the first safety switch port to perform locking, and the second lock instruction input unit being configured to receive a lock instruction for instructing the lockable safety switch connected via the second safety switch port to perform locking.

8. The wiring unit according to claim 1, wherein, when a plurality of the lockable safety switches are connected as the plurality of safety switches, the wiring unit MCU supplies a same lock input to each of the plurality of lockable safety switches.

9. The wiring unit according to claim 1, further comprising:
a housing that accommodates the wiring unit MCU; and
an indicator lamp that is provided on the housing and individually displays a state of each of the plurality of safety switches based on information received from the plurality of safety switches via the wiring unit communication terminal.

10. The wiring unit according to claim 1, further comprising:
a housing that accommodates the wiring unit MCU; and
an OSSD indicator lamp that is provided on the housing and displays a state of the first safety signal received by the safety input terminals included in the safety switch port.

11. The wiring unit according to claim 1, further comprising:
a housing that accommodates the wiring unit MCU; and
a cable as the safety output unit extending to an outside of the housing.

12. The wiring unit according to claim 1, further comprising:
a housing that accommodates the wiring unit MCU; and
a cable as the lock instruction input unit extending to an outside of the housing.

13. The wiring unit according to claim 1, further comprising:
a housing that accommodates the wiring unit MCU; and
a cable as the information output unit extending to an outside of the housing.

14. The wiring unit according to claim 1, further comprising:
a housing that accommodates the wiring unit MCU; and
a cable as the power input unit extending to an outside of the housing.

15. The wiring unit according to claim 1, wherein at least one of the safety output unit, the lock instruction input unit, the information output unit, and the power input unit is configured using a terminal block.

16. A serial cascade connector system comprising:
a first safety switch and a second safety switch as safety switches each including an actuator and a switch body that detects the actuator; and
a wiring unit to which the first safety switch and the second safety switch are connected in a cascade connection,
wherein at least one of the first safety switch and the second safety switch is a lockable safety switch including a lock portion capable of locking movement of the actuator in response to a lock input,
the first safety switch includes:
a pair of first safety input terminals configured to receive a second safety signal that is a pair of safety signals output from the second safety switch;
a pair of first safety output terminals configured to output a first safety signal, which is a pair of safety signals, to the wiring unit;
a first terminal configured to perform bidirectional communication with the second safety switch;
a second terminal configured to perform bidirectional communication with the wiring unit;
a detection unit detecting that the actuator is within a predetermined range with respect to the switch body;
a safety switch MCU that outputs the first safety signal based on the second safety signal received via the first safety input terminals and a detection result obtained by the detection unit, and outputs, via the second terminal, information indicating states of the first safety switch and the second safety switch based on information indicating the state of the second safety switch received via the first terminal; and
a failure sensing unit that senses a failure of the first safety switch,
the wiring unit includes:
a safety switch port that includes a pair of safety input terminals receiving the first safety signal, a power input unit configured to receive power, a pair of power output terminals configured to supply the power received via the power input unit to the first safety switch and the second safety switch, and a wiring unit communication terminal configured to perform bidirectional communication with the first safety switch;
a safety output unit that is internally connected to the pair of safety input terminals to perform through-output of the first safety signal received via the safety input terminals;
a lock instruction input unit that receives a lock instruction for locking the lockable safety switch;
an information output unit configured to individually output the information indicating the state of each of the plurality of safety switches; and
a wiring unit MCU that individually outputs the information indicating the state of the first safety switch and the information indicating the state of the second safety switch based on information received via the wiring unit communication terminal, and outputs the lock input for instructing locking based on the lock instruction received via the lock instruction input unit to the lockable safety switch via the wiring unit communication terminal, and
the safety output unit is internally connected to the pair of safety input terminals to enable sensing of a failure by a failure sensing unit included in the first safety switch at a destination where the first safety signal received from the through-output performed by the safety output unit.

17. The serial cascade connector system according to claim 16, wherein, when the wiring unit MCU receives the lock instruction via the lock instruction input unit, the lock input for driving the lock portion of the second safety switch as the lockable safety switch is input to the second safety switch at a timing different from a timing at which the lock portion is driven in the first safety switch as the lockable safety switch.

18. The serial cascade connector system according to claim 16, wherein
when activated, the wiring unit MCU transmits a switching signal to the first safety switch via the wiring unit communication terminal, and
the first safety switch switches an operation mode for two terminals of the first terminal and the second terminal, based on the switching signal, from a first operation mode in which one of the first terminal and the second terminal is used as a lock input terminal that receives the lock input and another terminal is used as a state information output terminal that outputs the information indicating the state of the first safety switch to a second operation mode in which the first terminal is used as an upstream communication terminal for bidirectional communication with the second safety switch and the second terminal is used as a downstream communication terminal for bidirectional communication with the wiring unit.

* * * * *